United States Patent
Kell et al.

(10) Patent No.: US 8,284,765 B1
(45) Date of Patent: Oct. 9, 2012

(54) SYSTEM AND METHOD OF PROVIDING COMMUNICATION SERVICE USING A PRIVATE PACKET NETWORK BACKBONE EXCHANGE

(75) Inventors: Scott D. Kell, Chicago, IL (US); James E. Brewer, Chicago, IL (US); Anthony J. Hiller, Chicago, IL (US)

(73) Assignee: Peerless Network, Inc., Chicago, IL (US)

( * ) Notice: Subject to any disclaimer, the term of this patent is extended or adjusted under 35 U.S.C. 154(b) by 667 days.

(21) Appl. No.: 12/469,454

(22) Filed: May 20, 2009

Related U.S. Application Data

(60) Provisional application No. 61/054,713, filed on May 20, 2008.

(51) Int. Cl.
  *H04L 12/66* (2006.01)
(52) U.S. Cl. .... 370/352; 370/356; 370/401; 379/220.01
(58) Field of Classification Search .................. None
  See application file for complete search history.

(56) References Cited

U.S. PATENT DOCUMENTS

| | | | |
|---|---|---|---|
| 4,442,321 A | 4/1984 | Stehman | |
| 4,476,347 A | 10/1984 | Hagen et al. | |
| 5,404,350 A | 4/1995 | DeVito et al. | |
| 5,509,059 A | 4/1996 | Crevits | |
| 5,566,236 A | 10/1996 | MeLampy et al. | |
| 5,610,977 A | 3/1997 | Williams et al. | |
| 5,764,745 A | 6/1998 | Chan et al. | |
| 5,844,981 A | 12/1998 | Pitchford et al. | |
| 5,930,348 A | 7/1999 | Regnier et al. | |
| 5,940,492 A | 8/1999 | Galloway et al. | |
| 5,953,403 A | 9/1999 | Lefort et al. | |
| 6,014,378 A | 1/2000 | Christie et al. | |
| 6,047,055 A | 4/2000 | Carkner et al. | |
| 6,137,869 A | 10/2000 | Voit et al. | |
| 6,282,574 B1 | 8/2001 | Voit | |
| 6,292,481 B1 | 9/2001 | Voit et al. | |
| 6,393,115 B1 | 5/2002 | Krauss et al. | |
| 6,405,028 B1 | 6/2002 | DePaola et al. | |
| 6,415,151 B1 | 7/2002 | Kreppel | |
| 6,430,275 B1 | 8/2002 | Voit et al. | |
| 6,480,898 B1 | 11/2002 | Scott et al. | |

(Continued)

OTHER PUBLICATIONS

"Notice and Order for Hearing," Before the Minnesota Public Utilities Commission, In the Matter of the Minnesota Independent Equal Access Corporation's Application for a Certificate of Public Convenience and Necessity, Docket No. P-3007/NA-89-76, Jun. 2, 1989, 6 pages.

(Continued)

*Primary Examiner* — Gregory Sefcheck
*Assistant Examiner* — Minh-Trang Nguyen
(74) *Attorney, Agent, or Firm* — Marshall, Gerstein & Borun LLP

(57) ABSTRACT

Systems and methods for providing communication service using a private packet network backbone exchange (PPNBE) are disclosed. The private packet network backbone exchange may include a logical call control entity, a logical routing database, one or more PPNBE gateways, and a private packet network. The PPNBE may provide "one-hop" call connection between a call-originating entity and a call-terminating entity without traversal of any other exchanges. The PPNBE may simultaneously support both one-hop local and long distance calls. The PPNBE architecture is easily scalable and incorporated into existing communication networks for on-net and off-net service. Methods and systems for providing access tandem communication service using a PPNBE are also disclosed.

27 Claims, 12 Drawing Sheets

U.S. PATENT DOCUMENTS

| | | | |
|---|---|---|---|
| 6,529,596 | B1 | 3/2003 | Asprey et al. |
| 6,532,288 | B1 | 3/2003 | Wood et al. |
| 6,574,201 | B1 | 6/2003 | Kreppel |
| 6,574,326 | B1 | 6/2003 | Wong et al. |
| 6,574,328 | B1 | 6/2003 | Wood et al. |
| 6,636,528 | B1 | 10/2003 | Korpi et al. |
| 6,865,266 | B1 | 3/2005 | Pershan |
| 6,870,857 | B1 | 3/2005 | Clevenger |
| 6,944,150 | B1 | 9/2005 | McConnell et al. |
| 6,985,446 | B1 | 1/2006 | Hurtta et al. |
| 6,999,463 | B2 | 2/2006 | Christie et al. |
| 7,038,574 | B1 | 5/2006 | Schlesener et al. |
| 7,069,301 | B2 | 6/2006 | Jerbi et al. |
| 7,096,023 | B1 | 8/2006 | Eikkula |
| 7,123,708 | B1 | 10/2006 | Gavillet |
| 7,248,576 | B2 | 7/2007 | Hoffmann |
| 7,333,441 | B2 | 2/2008 | Balletti et al. |
| 7,336,649 | B1 | 2/2008 | Huang |
| 7,340,436 | B1 | 3/2008 | Lilge |
| 7,372,869 | B2 | 5/2008 | Lobig |
| 7,617,287 | B2 | 11/2009 | Vella et al. |
| 7,889,722 | B2 | 2/2011 | Thompson |
| 2003/0131132 | A1 | 7/2003 | Cheng et al. |
| 2004/0022237 | A1* | 2/2004 | Elliott et al. .................. 370/356 |
| 2010/0042696 | A1 | 2/2010 | Vella et al. |

OTHER PUBLICATIONS

Desilver, "MEANS business: crossing state lines, Rural company seeks new markets," Minneapolis/St. Paul Business Journal, Nov. 29, 1996, 3 pages.

"Overview," About Iowa Network Services, 1997-2001 INS, Inc. 1 page.

"Order Granting Deregulation Petition in Part and Directing Additional Investigation Into Competitiveness of Operator-Assisted MTS," State of Iowa, Department of Commerce, Utilities Division, In Re: Deregulation of Interlata Interexchange Message Telecommunication Service (MTS) Wide Area Telecommunication Service (WATS), Channel Service (Private Line), and Custom Network Service, Docket No. INU-88-2, Apr. 5, 1989, 17 pages.

"Building Strong Communications, Based on a Solid Foundation," GLC: About GLC, 1 page.

"Form S-1 Registration Statement Under the Securities Act of 1933," Arbinet Holdings, Inc., Securities and Exchange Commission, Mar. 10, 2000, 5 pages.

"TCG-BellSouth Interconnection agreement to open multi-billion dollar switched access market to competition," Business Wire, Jul. 16, 1996, 3 pages.

"Access VT Switched Service," ICG Communications—Carrier Products, 3 pages.

"Rules Adopted Requiring LECS to Offer Signalling Information for Tandem-Switching Services (CC Docket 91-141, Transport Phase II)," Report No. DC-2602, May 19, 1994, 2 pages.

"TRC Telecom Launches New Tandem Switch," TRC Telecom, Sep. 29, 2005, 1 page.

"Wholesale Products," Wholesale Service Offerings, ICG Communications Inc., 3 pages.

Stark, "Table of Contents," Grande Communications Networks, Inc., May 21, 2001/Oct. 21, 2005, 57 pages.

"Memorandum Opinion and Order," *MGC Communications, Inc.* vs. *AT&T Corp.*, Federal Communications Commission, File No. EAD-99-002, Jul. 16, 1999, 6 pages.

"Memorandum Opinion and Order Regarding Plaintiff's Motion for Temporary Restraining Order and Temporary Restraining Order," *McLeondUSA Telecommunications Services, Inc.* vs. *Qwest Corporation* and *Qwest Communications Corporation*, In the United States District Court for Northern District of Iowa Cedar Rapids Division, No. C 05-0039-MWB, Mar. 23, 2005, 24 pages.

"Third Report and Order," In the Matter of Expanded Interconnection with Local Telephone Company Facilities, Federal Communications Commission, CC Docket No. 91-141, May 19, 1994, 29 pages.

"FCC Issues ISP Intercarrier Compensation Order, CLEC Access Charge Order and Intercarrier Compensation NPRM," McLean & Brown, May 1, 2001, 6 pages.

"IXCs Get a Break in CLEC Access Charge Proceeding," Telecom Policy Report, May 19, 2004, 2 pages.

"Eighth Report and Order and Fifth Order on Reconsideration," In the Matter of Access Charge Reform, Reform of Access Charges Imposed by Competitive Local Exchange Carriers, Petition of Z-Tel Communications, Inc. For Temporary Waiver of Commission Rule 61.26(d) to Facilitate Deployment of Competitive Service in Certain Metropolitan Statistical Areas, Before the Federal Communications Commission, CC Docket No. 96-262, May 13, 2004, 65 pages.

"Petition for Arbitration," Petition for Arbitration Pursuant to Section 252(b) of the Telecommunications Act of 1996 to Establish an Interconnection Agreement with Illinois Bell Telephone Company d/b/a Ameritech Illinois, Illinois Commerce Commission, Docket No. 00-0027, Jan. 12, 2000, 64 pages.

"Arbitration Decision," Petition for Arbitration Pursuant to Section 252(b) of the Telecommunications Act of 1996 to Establish an Interconnection Agreement with Illinois Bell Telephone Company, d/b/a Ameritech Illinois, Illinois Commerce Commission, May 8, 2000, 20 pages.

"Section 4 Network Design and Configuration Control," Bellcore Notes on the Networks, Issue 3, Dec. 1997, 27 pages.

"*Ex parte* of Neutral Tandem, Inc. on AT & T/BellSouth Proposed Transit Service Merger Conditions; WC Docket No. 06-74," Letter to Marlene H. Dortch, Secretary, Federal Communications Commission, Dec. 29, 2006, 2 pages.

"About Syringa Networks," Syringa Networks/We know Idaho Networking, http://www.syringanetworks.net, 3 pages, Mar. 4, 2008.

"Arbinet Background/Solutions Overview," About Arbinet, 8 pages, p. 1—http://web.archive.org/web/19980430054731/www.arbinet.com/2top.htm, accessed Jun. 30, 2008, p. 2—http://web.archive.org/web/20000512022025/www.arbinet.com/arbiback.htm, accessed Jun. 30, 2008, p. 3—http://web.archive.org/web/19980430054709/www.arbinet.com/3top.htm, accessed Jun. 30, 2008, p. 4—http://web.archive.org/web/19980430054715/www.arbinet.com/arbisol.htm, accessed Jun. 30, 2008, pp. 5-8—http://web.archive.org/web/19980430054725/www.arbinet.com/solver.htm, accessed Jun. 30, 2008.

"Direct Connect Switched Service," ICG Communications—Carrier Products, 2 pages, 2000, http://web.archive.org/web/0000816161245/www.icgcomm.com/pro . . . , accessed Jun. 24, 2008.

"Network Map," US LEC Network—The Competitive Telephone Company, 4 pages, Oct. 1, 1999, http://web.archive.org/web/199991001051530/www.uslec.com/ncmap.html, accessed Jun. 18, 2008.

"Products and Services," Focal Communications—Products and Services—Telecom Services, 17 pages, 1998-2000, http://web.archive.org/web/20000126202050/focal.com/about/network.html, accessed Jun. 18, 2008.

"Products: Telecom Services," Focal Communications Corporation—Telecom Services, 3 pages, 1998-2000, http://web.archive.org/web/19980530032757/www.focal.com/htm/tel . . . , accessed Jun. 18, 2008.

"Products & Services, Corporate Services," Focal Communications—News Room, 4 pages, http://web.archive.org/web/20000301090246/http://focal.com/about/af_network.html, accessed Jun. 18, 2008.

"DMS-500," Nortel: Products: DMS-500: Competitive Access Providers, 4 pages, 1999-2005, http://products.nortel.com/go/product/assoc.jsp?segld=0&pa . . . , accessed Jun. 23, 2008.

"Wholesale: Products and Services, Alternate Routing for Location Routing Number (ARLRN)—V4.0," Qwest/ Wholesale/Single Location Routing Number, 6 pages, Feb. 28, 2008, http://www.qwest.com/wholesale/clecs/slrn.html, accessed Jun. 18, 2008.

History of Network Switching, AT & T: History: History of AT & T Network: History of Network Switching, 2 pages, 2008, http://www.corp.att.com/history/nethistory/switching.html, accessed Jun. 30, 2008.

\* cited by examiner

SYSTEM AND METHOD OF PROVIDING COMMUNICATION SERVICE USING A PRIVATE PACKET NETWORK BACKBONE EXCHANGE

CROSS-REFERENCE TO RELATED APPLICATIONS

This application claims priority to U.S. Provisional Application Ser. No. 61/054,713, entitled "System and Method of Providing a Single Exchange Communication Service Using a Private Network Backbone," filed May 20, 2008, the disclosure of which is hereby expressly incorporated herein by reference.

TECHNICAL FIELD

The following disclosure relates to a system and a method for providing a communication service. The system and method may use a private network backbone exchange.

BACKGROUND

In today's telephony and communication networks, call completion may require traversal through multiple switches and/or network elements owned, operated or controlled by multiple service providers. Each service provider and its related network elements through which a call is routed may negatively impact the cost and quality of the call, as well as the availability of features and services.

Consider a route of a long distance communication call originated by a calling subscriber of local service provider A in one city and terminating at a called subscriber of local service provider B in another city across the country. The calling subscriber may originate the communication call using customer-premises equipment (CPE) such as a landline or wireless telephone, smart-phone, DSL modem, cable modem, computer or the like. A network element controlled by a local service provider A may receive the originating communication call.

Local service provider A may be, for example, a local telephone service provider, a wireless service provider, a cable provider, a Voice over Internet Protocol (VoIP) provider, or some other company that provides communication service to subscribers. Each different local service provider may have a different type of network element via which a CPE may send or receive calls, depending on a corresponding access technology. For instance, a local telephone company may have a local exchange switch, a cable company may have a cable modem termination system (CMTS), a wireless service company may have a cell site, base station or equivalent, a VoIP provider may use installed software on the CPE or at a local or remote server, etc.

In this example, suppose local service provider A provides plain old telephone service (POTS) to a residential land-line telephone subscriber. In order to route the originating communication call across the country to a terminating CPE using the public switched telephone network (PSTN), the communication call may be converted from the format understood by the local exchange switch of local carrier A into a telephony protocol understood by a tandem exchange A1. The originating call may then be routed through tandem exchange A1. Tandem exchange A1 may be controlled or owned by a company that may or may not be the same as local carrier A. From tandem exchange A1, the call may then be converted into another telephony protocol and routed to a long distance network element, such as a long distance switch. The long distance network element may be owned or controlled by yet another company, such as a long distance carrier. The call may be routed through potentially multiple network elements or switches in potentially multiple long distance networks controlled by one or more long distance companies. Eventually, the call may be routed to the appropriate tandem switch B1 at the called end that may be owned by yet another different company, and then to the local exchange switch controlled by local service provider B. Finally, the call may terminate at the CPE of the called subscriber.

Note that in this example, multiple carriers and multiple network elements or switches may be involved for routing the communication call—e.g., local exchange switch of local service provider A, tandem exchange A1, potentially multiple switches in one or more long distance networks, tandem exchange B1, and local exchange switch of local carrier B. At each leg of the call and sometimes even within a leg of a call, the call must be converted into a format understood by the next switch or network element. Each time a call is converted from one format into another, some data loss may occur and lead to potential call degradation. Furthermore, the overall quality of the call and the availability of feature transparency may be dictated by the lowest bandwidth transmission protocol used by one of the network elements or switches in the entire call path. For the PSTN, the lowest bandwidth protocol that all service providers are able to accommodate is typically a 64 kbps channel for the content of a circuit switched call, and a 56 kbps data stream for the signaling control of the call. If local service provider A provides a feature that requires a higher bandwidth internal to its own network, the feature may not be transparent across all networks traversed by the routing of the call as the lowest common supported bandwidth is only a 64 kbps content channel and a 56 kbps signaling channel.

Moreover, the overall cost of the call may be excessive as each company, owner, or service provider that controls each of the network elements may charge for routing the call through their particular network element. Local service providers or carriers are required to negotiate multiple complex network connection and access agreements with multiple other providers, and may reflect or pass along resulting increased costs to their subscribers.

In another scenario of the aforementioned example, suppose local service provider A provides voice over Internet protocol (VoIP) communication services to the calling subscriber. In addition to the cost and quality drawbacks previously discussed above for a POTS local carrier, additional undesired effects may occur for a VoIP local carrier. VoIP service providers generally use the public Internet to route calls. Each Internet node traversed by the call is typically not owned or controlled by a single provider, let alone the VoIP carrier itself, so the overall call path cannot be aggregately engineered to ensure call quality. The routing of VoIP calls across various nodes in the public Internet may result in delays and/or unreliable service. Public Internet access points may expose inherent security risks for VoIP calls. Moreover, VoIP originated calls to non-VoIP subscribers necessarily require conversion of the calls into standard telephony format for routing through the PSTN, thus incurring similar quality and cost issues as discussed above for a non-VoIP originated call.

Carriers or service providers have attempted to address these drawbacks by expanding the sizes of their networks and deploying higher-bandwidth network elements within their individual networks. With the current deregulated communication industry, however, a significant and sizeable percentage of communication calls are off-net, that is, the carrier or service provider controlling the network of the call's originating end is different from the carrier or service provider controlling the network of the call's terminating end. With multiple types of subscriber, local or other access technologies available to be used for communication calls (e.g., landline, wireless, cable telephony, VoIP, POTS, etc.), off-net calls often require conversion to a different protocol or technology supported by the next network element. Multiple conversions along the call path may result in loss of data and therefore a decrease in call quality. The issues of call quality and cost may thus be traced, in a significant part, to the conversions between connections of different service provider networks in the call path.

Moreover, connections between different service provider networks add to the difficulty of feature transparency and/or availability to subscribers or end-users. Different networks operated by different carriers in the call path may not have sufficient bandwidth to support features and services available within an originating carrier's own network. A network provider may introduce new features within its network, but once a call goes off-net, the new features may not be compatible with the networks of other service providers. Each service provider is left to negotiate cost and technical interworking in a pair-wise fashion with any other service provider to whom it wishes to connect. Thus, feature and service transparency across multiple service providers may be difficult.

SUMMARY OF THE DISCLOSURE

A private packet network backbone exchange (PPNBE) is disclosed. The PPNBE may include a single logical switch for providing "one-hop" routing between carriers and/or local service providers, thus allowing costs to be reduced and service quality to be improved. The private packet network backbone exchange may provide "one-hop" routing for both local calls, long distance calls, and other types of calls.

The term "one-hop routing," as used herein, means that an originating call is routed from a local carrier at the calling end through only one logical exchange before terminating at a same or different local carrier at the called end. As used herein, a "call" is understood to be a communication connection between at least one originating party and at least one terminating party. In this disclosure, a "call" may transmit voice, data, both, or other types of content for communication between parties. For instance, a call may be a voice call, a fax, a multi-media transmission, a connection to a recorded message, a text message, and the like. As also used herein, the terms "subscriber," "user," and "end-user" are used interchangeably and are understood to be a person or entity having an agreement for communication service (e.g., to originate and/or terminate calls) via a network of a carrier or local service provider. Also herein, the terms "access technology," "subscriber access technology," and "local access technology" are used interchangeably to refer to any known technology by which an end-user or subscriber may connect from his or her CPE to access a communication service provider's network for communication service. Such access technologies may include a physical connection, wireless connection of any frequency band, cable telephony, VoIP, POTS, and other possible access technologies. In some embodiments, for VoIP access technologies, the CPE may use a dedicated IP connection, the Internet or some combination of the two, for example, for load-balancing, overflow, redundancy or failover purposes.

The PPNBE may be able to simultaneously support calls of any distance or regulatory jurisdiction, including but not limited to local, toll, intrastate, interstate and international calls. The PPNBE may include a single logical switch that may be controlled, owned, and/or operated by a PPNBE service provider. The PPNBE may be scalable to support additional communications traffic, but still may appear to a communications network to be a single logical switch. In some embodiments, one PPNBE switch may even be able to serve communication traffic for an entire country, yet still maintain a logical appearance of a single switch.

The PPNBE may be able to provide interconnectivity between multiple different subscriber technologies offered by multiple carriers and/or local service providers. The PPNBE may provide a platform to support seamless feature and service integration across multiple carriers and/or local service providers, including those features and/or services requiring higher bandwidths. Both non-voice and voice communication traffic may be able to be simultaneously supported by the PPNBE. Also, security of communications and premium call quality may be able to be provided in a deterministic, controlled manner by the PPNBE.

An embodiment of the architecture of a PPNBE may include a private network "backbone." This private network backbone may utilize technology and protocols that may support control call quality, interworking, feature interaction, and other services between the networks of originating and terminating service providers. In some embodiments, the private network backbone may use IP (internet protocol) over a private, packet-switched network. In other embodiments, the PPNBE may use ATM or a packet and/or cell switching technology other than IP. The PPNBE may provide a private, secure means of interconnecting multiple, disparate carrier and/or local provider networks.

A method of providing communication service using a private packet network backbone exchange is disclosed. The method may include receiving a call from a first exchange at a private packet network backbone exchange, establishing a call instance within the PPNBE, and "one-hop" routing the call within the PPNBE to a second exchange. In some embodiments, the first, second or both exchanges may be a customer premise equipment (CPE).

A method of providing communication service between an inter-exchange carrier (IXC) and a plurality of end-office exchanges using a private packet network backbone exchange is disclosed. The method may include providing a local trunk group between a private packet network backbone exchange and each of the plurality of end-office exchanges, and providing an only IXC trunk group between the PPNBE and the IXC. The method may also include routing a volume of communication traffic between the IXC and the plurality of end-office exchanges via the only IXC trunk group and the PPNBE. The only IXC trunk group may support the volume of communication traffic independent of how great the volume of communication traffic is, and independent of the number of end-office exchanges.

DETAILED DESCRIPTION

Figure 1:
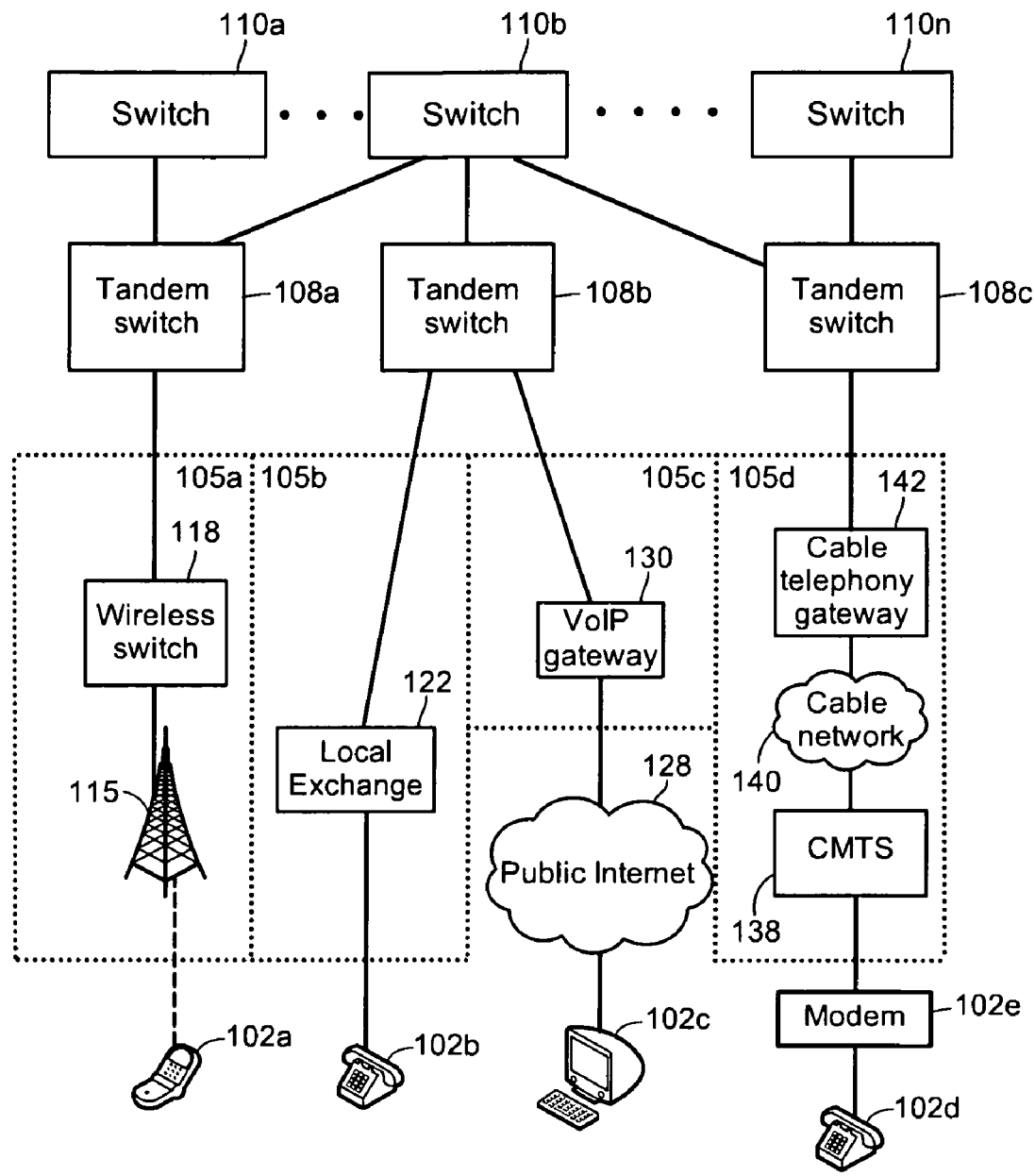
FIG. 1 is a diagram of an example of a current communication network architecture.

FIG. 1 is a diagram of a current communication network architecture 100. Customer premises equipment (CPE) (references 102a, 102b, 102c, 102d, 102e) may interface with network elements controlled by local service providers or carriers (references 105a, 105b, 105c, 105d). Network elements of carriers or local service providers 105a, 105b, 105c, 105d may interface with local exchange carrier (LEC) tandem exchange switches (references 108a, 108b, 108c) that may be, in turn, connected to long distance switches or interexchange carriers (IXCs) (references 110a, 110b, . . . 110n).

Consider the example of routing an originating long distance wireless communication call through the existing communication network 100. A subscriber may initiate a call from a wireless device 102a using any frequency band, smartphone, computer supported by WiFi, WiMAX or other wireless access technology, or similar device. The wireless device 102a may communicate with a cell site, antenna or wireless service access point 115 owned, operated and/or controlled by a wireless service provider 105a. The call may be routed by the wireless service provider 105a from the wireless service access point 115 to the corresponding wireless switch 118. From the wireless switch 118, the call may then be routed to a tandem switch 108a and into a long distance network via a long distance switch such as long distance switch 110a or 110b. Using existing telephony routing procedures, the call may be routed through multiple long distance switches 110a, 110b, . . . , 110n in the direction of the terminating party.

Next, consider an example of an originating landline telephone call. A subscriber to a local telephone service provider 105b may initiate a long distance call from a telephone, fax, or other such device 102b. Local telephone service provider 105b may be a LEC, a Competitive Local Exchange Carrier (CLEC) or other type of local telephone service provider. Local telephone service provider 105b may own, operate, partially or totally lease, and/or control a local exchange switch 122 that receives the origination from CPE device 102b. The dialed digits in the origination may be analyzed by local exchange switch 122, and the call may be routed to the connecting tandem exchange 108b and to a long distance switch 110b. The call may then traverse through a long distance network (references 110a, 110b, . . . , 110n) towards the terminating device.

In an example of an originating VoIP call, a subscriber to a VoIP carrier 105c may initiate a call from a computer or other device 102c. The originating VoIP call may be set up via, for instance, VoIP software on device 102c and/or a server of VoIP carrier 105c using a wired or wireless (e.g., Wi-Fi) connection. The call may then be routed through the public Internet 128. The call may exit the public Internet 128 at a VoIP gateway 130 that may connect with a tandem switch 108b of the PSTN, and then may be routed to a long distance switch 110b. The call may then traverse through the long distance network (references 110a, 110b, . . . , 110n) towards the terminating destination.

In an example of a call in a cable telephony network 105d, a cable telephony subscriber may initiate a call from a device 102d such as a telephone or other device in communication with a modem 102e such as a cable modem or multimedia terminal adapter (MTA). Using typical cable telephony architecture, the call may be received at the head-end (usually by a cable modem termination system (CMTS) 138), routed through the cable telephony network 140, and exit the cable telephony system via a cable telephony gateway 142. The call may then be routed to a tandem exchange switch 108c and to a long distance switch 110n. The call may then traverse through the long distance network (references 110a to 110n) towards the terminating destination.

One of ordinary skill in the art will understand that although only four types of local service providers (105a, 105b, 105c, 105d) are illustrated by FIG. 1, other types of local service providers supporting other types of local or subscriber access technologies and communication services are also possible. For instance, communication calls may be originated using DSL or other types of modems, different radio frequency bands and access technologies, and the like. In some embodiments, a local service provider may be a private branch exchange or system, such as used for a college, governmental or corporate entity.

One of ordinary skill in the art will also understand that the terminating side of any of the calls in the above examples may follow any of the originating routing paths, but in reverse. For instance, the terminating side of a communication call destined for a VoIP subscriber may be routed through a long distance network 110a-110n to a tandem exchange switch 108b, through a corresponding VoIP gateway 130 of a VoIP provider 105c, converted by the VoIP provider into a format for traversing the public Internet 128, and eventually terminate at a computer 102c of the called VoIP subscriber. Similar reverse routings may occur for calls terminating to a wireless device 102c of a subscriber to wireless service provider 105a, a landline phone or device 102b of a subscriber to local service provider 105b, and/or a device 102d, 102e of a subscriber to cable telephony service provider 105d. Communication calls may originate with subscribers of any local service provider or carrier using any access technology, and may terminate at a subscriber of any type of local service provider or carrier using any access technology.

Additionally, one of ordinary skill in the art will understand that a LEC tandem switch typically serves a portion of a LATA (Local Access and Transport Area) and thus may interface with multiple different types of competitive LECs (CLECs) having end-user/subscribers in the portion of the LATA. For example, the tandem switch 108a (in addition to servicing wireless customers accessing via the wireless switch 118) may also service landline customers, cable telephony customers, VoIP customers and other types of CLEC customers associated with the corresponding portion of the LATA that the tandem switch 108a services. In a likewise manner, each tandem switch 108a-108c may service their respective portions of a LATA and customers therein accordingly.

Using tandem LECs 108a-108c in this architecture may result in several undesirable consequences. For example, calls originating and terminating within a LATA must be switched between corresponding LEC tandem switches. Thus, CLECs become reliant upon the LEC to correctly engineer the tandem switches to reliably handle the intra-LATA traffic load. As additional traffic loads are added to a particular tandem switch, additional local trunk groups may need to be engineered and added between end-offices and the particular tandem switch. In some cases, the particular tandem switch may need to be split and local trunk groups to end-offices re-homed in order to support a desired traffic volume. Additional difficulties as a result of the architecture may also occur when CLECs directly compete with the LECs for end-users or subscribers yet must lease call paths through an exchange owned by the LEC and must thus rely on a competitor to engineer the resources used for the call paths. This reliance may cause an awkward and potentially conflicting business situation.

In some current telephony architectures, one or more of the switches $110a$-$110n$ may be inter-exchange carriers (IXCs). A call originating from a first local carrier destined for a second local carrier may be required to route through tandem exchanges and one or more IXC switches in order to complete. In FIG. 1, for example, each IXC switch $110a$-$110n$ may be forced to have pair-wise connections with each of the multiple LEC tandems $108a$-$108c$ within a LATA. Multiple trunk groups between the IXC and each LEC tandem $108a$-$108c$ in the LATA must be engineered and maintained. For each call, the IXC must pay (typically, a cost per minute usage of a trunk group and a port charge) to connect to a tandem exchange.

Each of the switches and/or network entities illustrated in FIG. 1 (e.g., references $110a$-$110n$, $108a$-$108c$, 118, 122, 130, 142) may have a unique point code with which to identify itself to the other network elements of the PSTN. Each of the switches and/or network entities illustrated in FIG. 1 (e.g., references $110a$-$110n$, $108a$-$108c$, 118, 122, 130, 142) may have a corresponding routing database to use, manage and administer. Each of the switches and or network entities of FIG. 1 (e.g., references $110a$-$110n$, $108a$-$108c$, 118, 122, 130, 142) may be controlled, owned and/or operated by a different company. In some arrangements, one company may own, operate and/or control more than one network element $110a$-$110n$, $108a$-$108c$, 118, 122, 130, 142. For example, long distance switches $110b$ and $110n$ may be owned by different long distance service providers, thus tandem $108c$ may have a connection to both switch $110b$ and $110n$ so calls for subscribers of each long distance provider may be routed accordingly.

Originating and terminating calls that are wholly contained within a single provider network, such as one of networks $105a$, $105b$, $105c$ or $105d$, may have an optimized bandwidth and support a set of features and services for intra-network calls. Calls across and between different networks, however, must be converted into a format that is understood by the next network element in the routing path of the call. Each conversion of a call from one format to another may introduce extra costs and may have an adverse impact on call quality metrics, such as delay and echo. Furthermore, the overall transmission rate is limited by the lowest common bandwidth protocol supported by any network element in the call path. For standard telephony, this limitation is typically 64 kbps for a circuit switched voice call, and 56 kbps for call signaling channels. Converting an off-net call to a lowest commonly known bandwidth may also strip out features and services that might otherwise be available if a call were completed within a single service provider network, such as one of $105a$, $105b$, $105c$ or $105d$.

Figure 2A:
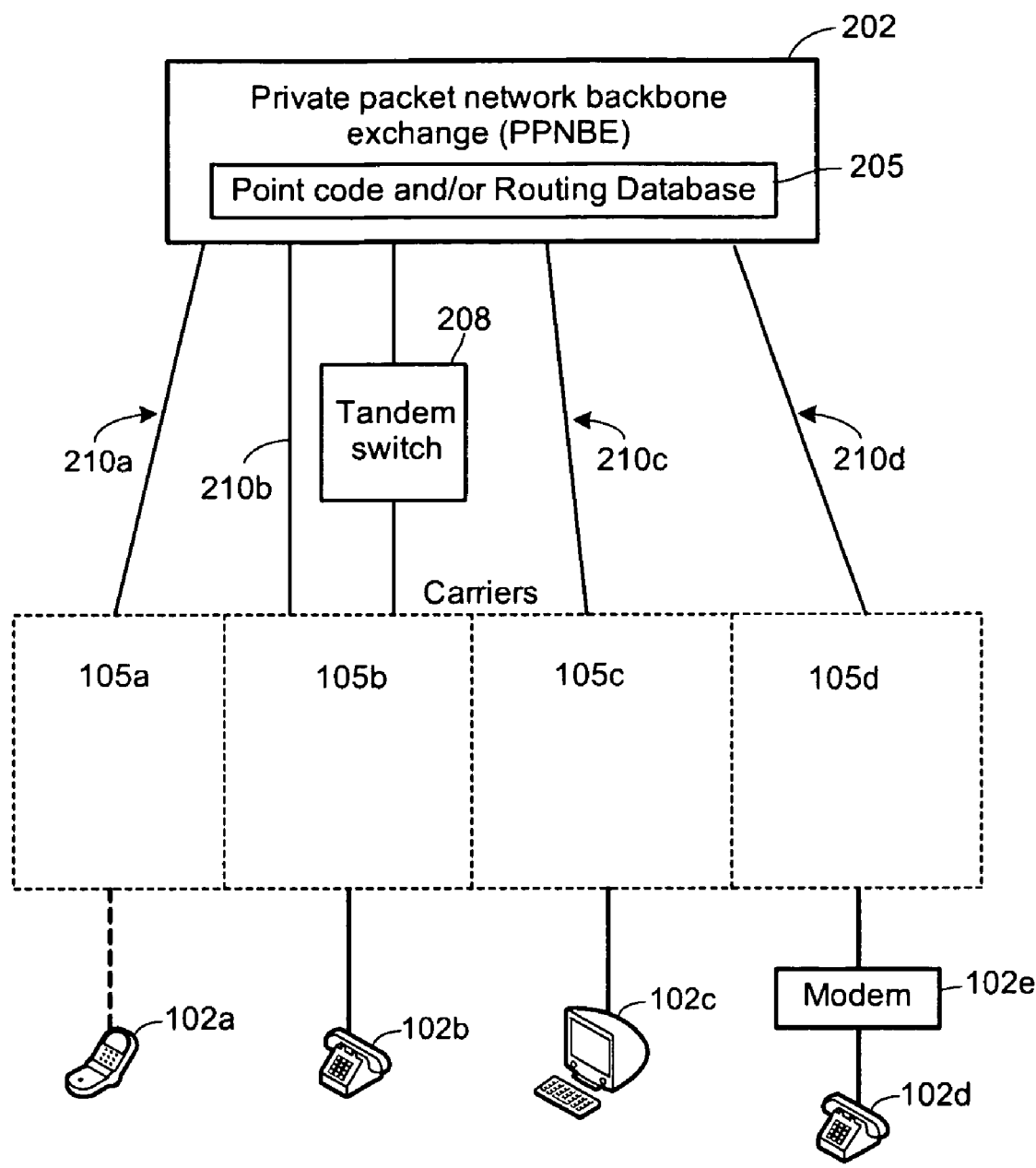
FIGS. 2A and 2B depict an embodiment of a communication network including a private packet network backbone exchange.

FIG. 2A depicts an exemplary embodiment of a communication network 200 having a private packet network backbone exchange (PPNBE) 202. Instead of having multiple tandem exchanges $108a$, $108b$, $108c$ and long distance or IXC switches $110a$, $110b$, . . . , $110n$ for routing calls as shown in the communication network 100 of FIG. 1, a carrier or local service provider such as $105a$, $105b$, $105c$ or $105d$ may connect and route calls directly to the private packet network backbone exchange switch or network element 202 without being required to traverse through a tandem switch, as illustrated by references $210a$, $210b$, $210c$ and $210d$, respectively. In some embodiments, however, a carrier such as illustrated by the carrier $105b$ may choose not to connect directly as depicted by the reference $210b$, but instead may choose to connect to the PPNBE 202 via a tandem switch 208. These embodiments may be used, for example, if the carrier $105b$ is the owner, operator, lessee and/or controller of tandem switch 208, and/or if the carrier $105b$ desires to connect with the PPNBE 202 to provide service with minimal disruption to an embedded communications architecture.

A call may originate from a subscriber of any known type of carrier or local communication service provider, such as the wireless service provider $105a$, the local service provider $105b$, the VoIP provider $105c$, the cable provider $105d$, or another type of communication service provider (not pictured). A call may originate using any known access technology, e.g., wired or cable telephone connection, VoIP over wired or wireless access, wireless access of any known frequency, and the like. An originating call may take "one-hop" from the network element operated or controlled by its corresponding local service provider $105a$-$105d$, route to the PPNBE 202, and then traverse directly from the PPNBE 202 to the appropriate network element of the terminating-side local service provider ($105a$-$105d$) as indicated by the dialed digits of the originating call. The call may traverse from the originating exchange through the private packet network backbone exchange 202 to the terminating exchanges without traversing any other exchanges, i.e., "one-hop."

Likewise, on the termination end, after exiting the PPNBE 202, a call may terminate to a local exchange of a carrier ($105a$-$105d$) using any known access technology.

The exchange 202 may have a single logical point code or may be identified via information in a single logical routing database 205. A point code, as known to those with ordinary skill in the art, is a unique address identifying a node, network element or switch in the PSTN. The single logical routing database may include information about one or more point codes of the PPNBE 202. In some embodiments, the PPNBE 202 may have a single point code 205 to service inter-carrier communication traffic of varying volumes. In some embodiments, the PPNBE 202 and its point code 205 may service inter-carrier communication traffic for an entire country. Any on-net calls originated at a calling party's local service provider anywhere in the country may be able to be routed in a single hop through the private packet network backbone exchange 202 directly to a called party's local service provider $105a$-$105d$ anywhere in the country. In this embodiment, the private packet network backbone exchange 202 thus may serve as a single national exchange. In another embodiment, multiple point codes may be assigned to the PPNBE 202 to support increased capacity, however, all point codes for the PPNBE 202 may be included in the single logical routing database 205.

The single "one-hop" call path provided by the private packet network backbone exchange 202 may improve call service quality metrics over metrics of a call serviced by the current communication network 100. Decreasing the number of network elements in the call path results in fewer call content conversions and may lessen the chance of data loss. Further, fewer network elements in the call path may mean fewer service providers who may add to the incremental costs of a call, and the overall cost to complete a call may be significantly decreased. Furthermore, the PPNBE 202 may easily be engineered and maintained to provide the ability to ensure uniform quality of service for all calls as it may be owned, operated and/or controlled by a single entity.

Moreover, to the significant benefit of each individual carrier 105a, 105b, 105c and 105d, each individual carrier or service provider may take advantage of the ability to interconnect with and route calls to/from any other carrier that is connected to the private packet network backbone exchange 202 without having to negotiate complex service agreements or having to develop, test, and pay for a plethora of pair-wise technology connections and conversions. With a connection to the PPNBE 202, the individual carrier is provided interworking with any other carrier or local service provider having any type of subscriber access technology. The PPNBE 202 enables local service providers to easily integrate and interwork embedded equipment in their existing networks with those of other service providers.

Figure 2B:
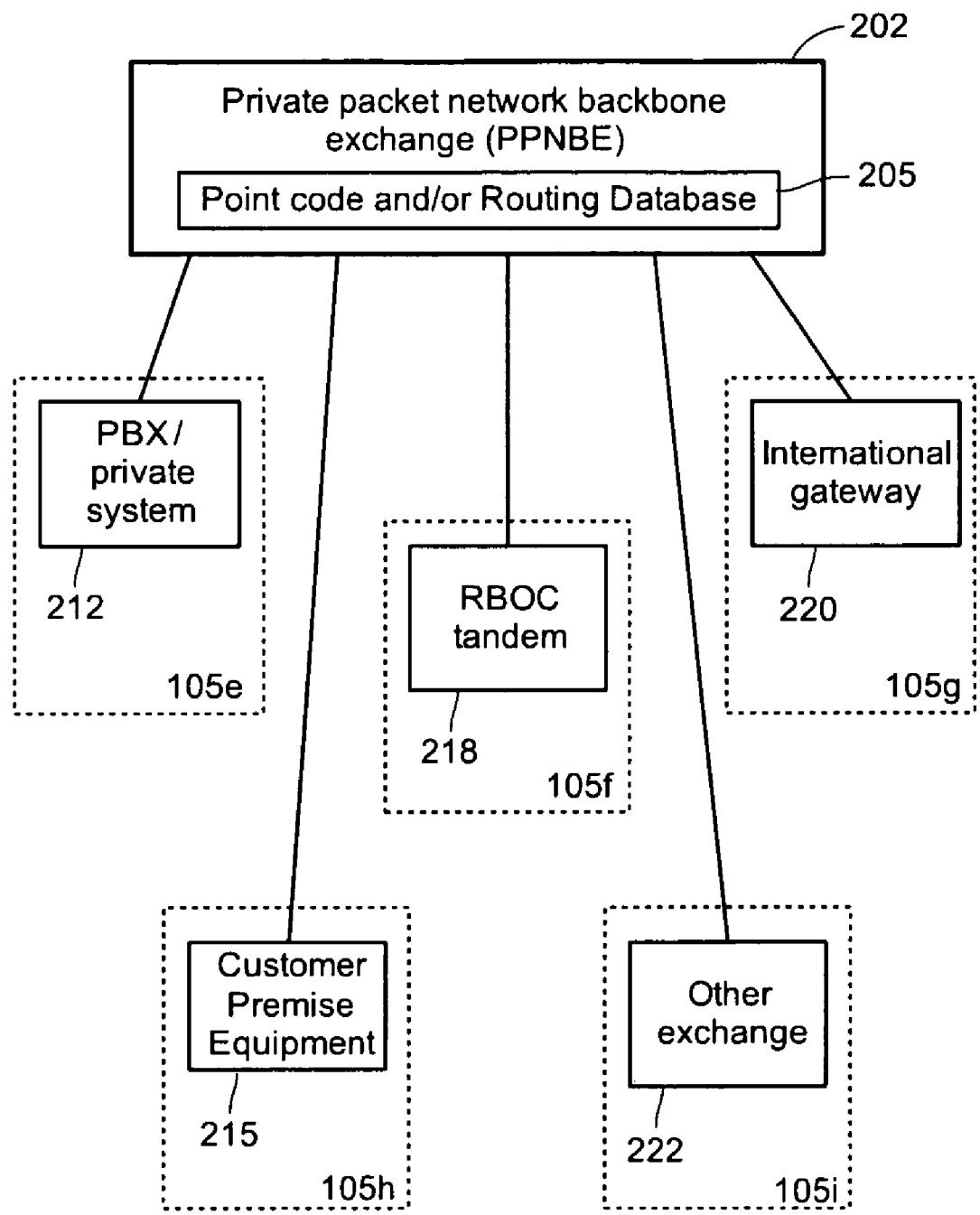

FIG. 2B illustrates additional possible entities that may connect to provide communication service in conjunction with the private packet network backbone exchange 202. For example, the PPNBE 202 may be connected to a private branch exchange (PBX) or private communication system 212 that may be owned/operated by a service provider 105e such as a college, government or corporate entity. The PPNBE 202 may provide a direct connection to a CPE 215 owned and/or operated by an end-user 105h. The CPE 215 may be directly connected to the PPNBE 202 without need for intermediate switches (e.g., an intermediate exchange 105a, 105b, 105c, 105d or 208) or associated intermediate connections (e.g. an intermediate connection 210a, 210b, 210c or 210d). The direct connection to the CPE 105h may occur, for example, in areas where telecommunication regulations do not require long distance and local carriers to be divested. By including direct connections to CPEs 105h, the private packet network backbone exchange 202 may enable a PPNBE service provider to provide a total communications service package to end-users, including long distance and local service using any type of subscriber access technology.

As further illustrated in FIG. 2B, the PPNBE 202 may have a connection to other exchanges or entities, including, for example, a tandem 218 owned and/or operated by an RBOC (Regional Bell Operating Company), a competitive tandem service provider, or another party 105f, an international gateway exchange 220 owned or operated by an international communication service provider 105g, or some other type of exchange 222 owned and/or operated by some other service provider 105i. In this manner, the PPNBE 202 may be enabled to "one-hop route" a call originating from any first exchange to any second exchange. The PPNBE 202 may also be enabled to "one-hop route" any calls originating and terminating in a same exchange, for example, in a scenario where a first wireless subscriber calls a second wireless subscriber homed on the same wireless provider switch.

The first and second exchanges may each be any type of communication exchange or CPE owned and/or operated by the service providers 105a-105i in FIGS. 2A and 2B. One of ordinary skill in the art will understand that although a limited number of types of service providers (105a-105i) and their corresponding equipment are illustrated in FIGS. 2A and 2B, other types of local service providers operating or owning exchanges or equipment that support other types of known access technologies and communication services are also possible. In fact, the private packet network backbone exchange 202 may operate in conjunction with any other known type of communication exchange or entity to which calls may be terminated and/or from which calls may be received. The first and the second exchanges may be a same type of communication exchange, entity, or CPE, or the first and the second exchanges may be different types.

Not all communication networks including the private packet network backbone exchange 202 will contain all types of communications equipment illustrated in FIGS. 2A and 2B. In some embodiments, a private packet network backbone exchange 202 may be incorporated into a communication network with only one type of communication exchange and/or CPE owned and/or operated by one of the service providers 105a-105i, and in other embodiments, a PPNBE 202 may be incorporated into a communication network with more than one type of communication exchange and/or CPE owned and/or operated by one of the service providers 105a-105i.

Figure 3:
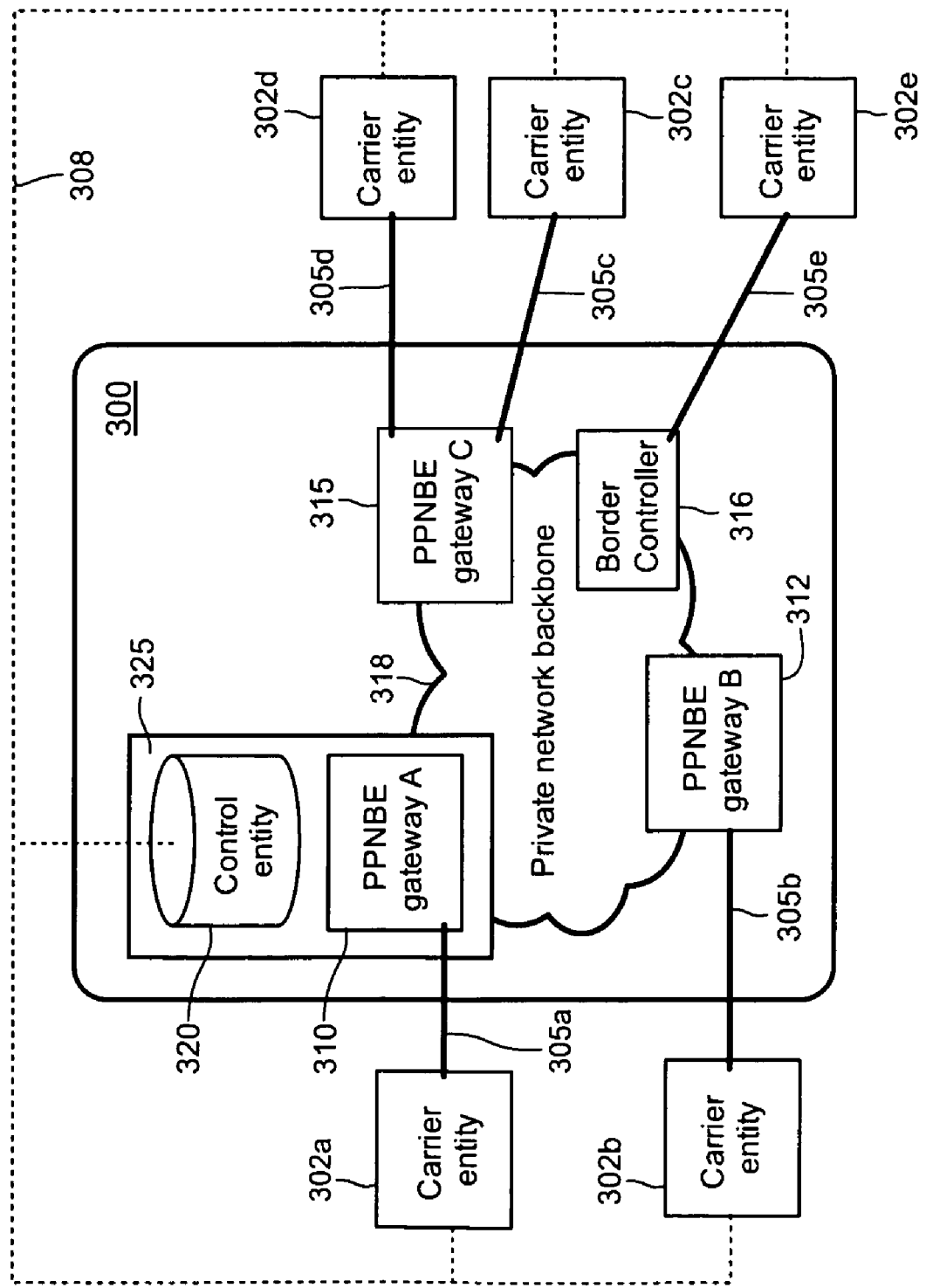
FIG. 3 illustrates an embodiment of a private packet network backbone exchange.

FIG. 3 illustrates an embodiment of a private packet network backbone exchange (PPNBE) 300, that may be used in, for example, the communication network 200 of FIGS. 2A and 2B. In FIG. 3, the PPNBE 300 may be connected to one or more carrier entities 302a, 302b, 302c, 302d, 302e. A carrier entity, as used herein, may be a carrier or service provider that has an agreement with an end-user, subscriber or user for communication service such as, for example, one of the service providers 105a-105i of FIGS. 2A and 2B. The carrier entity may own and operate the equipment to which an end-user's CPE may connect to support service. Alternatively, a carrier entity may not have any end-users or subscribers at all, such as carrier entities that operate IXCs or tandem exchanges. In some cases, a carrier entity may not own specific communications equipment, but may still operate the specific communications equipment by leasing from or entering into an agreement with an owning entity of the equipment for use of the specific communications equipment or portions thereof. For example, a carrier entity that provides wireless service may procure the rights to route calls over the network of a long distance carrier in order to provide long distance service to wireless subscribers. Or, in another example, a CLEC may procure rights to send and receive traffic through an access tandem owned by an RBOC. Thus, a "carrier entity," as used herein, may be an entity that owns, controls, or operates communications equipment and/or provides communication service over the communications equipment.

A carrier entity (302a-302e) may own, control and/or operate embodiments of one or more communications equipment or portions thereof such as illustrated in FIGS. 1, 2A and 2B such as the wireless switch 118, the local access exchange or other telephony switch 122, access gateways to carrier networks (such as the VoIP gateway 130, the cable telephony gateway 142, or other type of gateway) and/or other network elements for routing communication calls. A carrier entity 302a, 302b, 302c, 302d and 302e may, additionally or alternatively, own, control and/or operate one or more tandem switches 108a, 108b and 108c or portions thereof. A carrier entity 302a, 302b, 302c, 302d and 302e may own, control and/or operate a PBX 212, a private communication system 212, an RBOC tandem 218, an international gateway exchange 220, or another type of exchange 222, to name a few. A carrier entity may own or operate a CPE 215. Examples of carrier entities may include, for example, wireless service providers, LECs, CLECs, VoIP service providers, cable telephony providers, institutions or companies owning and/or operating private communications systems, an end-user, and/or other carriers/service providers.

Each carrier entity 302a-302e may connect to the PPNBE 300 using two types of paths. Paths or channels carrying communication traffic or call content are denoted in FIG. 3 by heavy thick lines 305a, 305b, 305c, 305d and 305e. Communication traffic channels 305a-305e may carry voice traffic, data traffic, a combination of the two, or other types of communication traffic using any known communication traffic protocol. Paths carrying signaling may be an out-of-band signaling network 308, such as an SS7 network or other type of signaling network, or may be in-band signaling over connections 305a-305e. In some embodiments, one or more of the connections 305a-305d between a corresponding carrier entity 302a-302d and the PPNBE 300 may be a TDM (Time Division Multiplex) connection. In some embodiments, one or more of the connections (305a-305e) may be a VoIP (Voice over Internet Protocol) connection. For example, a specific carrier entity 302e may be in communication with the PPNBE over a VoIP-type connection 305e using SIP (Session Initiation Protocol).

Call traffic may access the private packet network backbone exchange 300 via a gateway 310, 312, 315, or, in the case of VoIP connection such as SIP, a network element 316 such as a session border controller gateway. As used herein, the term "PPNBE gateway" is not limited to mean a gateway of any particular technology, but may include gateways 310, 312, 315, 316 that may support any type of communication technology, for example, a TDM- and/or VoIP-supporting gateway. Call traffic may then traverse a private network backbone 318 to an appropriate terminating PPNBE gateway (310, 312, 315, 316), and be routed from the appropriate terminating PPNBE gateway (310, 312, 315, 316) of the private packet network backbone exchange 300 to the appropriate carrier entity (302a-302e) for the called subscriber. It is important to note that PPNBE gateways (310, 312, 315, 316) do not serve the same function as local access gateways of other types of local access networks, such as VoIP or cable telephony gateways (e.g., references 130 and 142 of FIG. 1, respectively). A PPNBE gateway 310, 312, 315, 316 may serve as an interface point from the PSTN or other carrier or local service provider network into the private IP backbone 318 of the private packet network backbone exchange 300. The PPNBE gateways 310, 312, 315 and 316 may be operated, owned, and/or controlled by a PPNBE service provider, i.e., a service provider that operates, owns and/or controls the private packet network backbone exchange 300 itself. Other carrier networks may have local access gateways that they self-manage and control, such as VoIP gateway 130 and cable telephony gateway 142 of FIG. 1, and the like. The local access gateways managed and controlled by other networks may interface with the PPNBE gateways 310, 312, 315 and 316. For example, carrier entity 302b may connect to the PPNBE gateway B 312 via a VoIP gateway, carrier entity 302d may connect to the PPNBE gateway C 315 via a cable telephony gateway, and so on. The local access gateways managed and controlled by other service providers, however, are not the same entities as the PPNBE gateways 310, 312, 315, 316 of the private packet network backbone exchange 300.

In some embodiments, the private network backbone 318 may include a set of privately managed nodes (not shown) to route packet call traffic. Each PPNBE gateway (310, 312, 315, 316) may convert call traffic from the protocol or format used by the originating carrier entity (302a-302e) into a packet format used by the set of privately managed nodes in the private network backbone 318. In some embodiments, the set of privately managed nodes may communicate using a packet format corresponding to an Internet Protocol format (IP). IP packets may be routed across the privately managed nodes in the private network backbone 318 to the PPNBE gateway corresponding to the carrier of the called party (310, 312, 315, 316), where the packets may be converted into a format understood by the corresponding terminating carrier entity (302a-302e). As the private network backbone 318 is not the public Internet and is privately managed, the number of nodes and routing of packets within the network 318 may be engineered and controlled to maximize call quality and minimize delay. Also, as the private network backbone 318 is not the public Internet and is privately managed, the access, security and privacy of calls are more easily controlled.

In some embodiments, the private network backbone 318 may use other types of protocols other than IP to deliver call traffic within the private network backbone 318. For example, the private network backbone 318 may use ATM (Asynchronous Transfer Mode) or other packet/cell switching technologies.

In the private packet network backbone exchange 300, control may be performed by a logical call control entity 320. The control entity 320 may include one or more servers or cloud computing devices, or other computing devices having a memory and having the ability to interface with a signaling network 308. Control entity 320 may provide call control as well as feature, service and other types of control needed for communication service. Control entity 320 may be represented to the PSTN and other networks as a single logical point code or may be identified via information in a single logical routing database, such as the point code or the routing database 205 of FIG. 2. Control entity 320 may or may not be physically co-located with the logical routing database, but information in the logical routing database may be accessible for use by the control entity 320 in establishing calls.

Carrier entities 302a-302e may transmit and receive control signals or messages via out-of-band signaling paths 308 through a signaling network. In some embodiments, the signaling network may be an SS7 signaling network, but other out-of-band signaling networks may also be used in accordance with embodiments of the disclosure. For some calls, control signals may be received in-band at a PPNBE gateway 310, 312, 315, 316. In-band control signals may be delivered to and received from the control entity 320 via the private network backbone 318.

In the embodiment of the configuration illustrated in FIG. 3, control entity 320 and PPNBE gateway A 310 are illustrated as being physically co-located 325. Physically co-locating the control entity 320 with other equipment such as PPNBE gateway A 310 may be beneficial for optimizing ease of maintenance and configuration of the PPNBE 300, but is not necessary. Control entity 320 may be located anywhere and is not required to be physically co-located with any PPNBE gateway 310, 312, 315, 316 or any other equipment that is a part of the private packet network backbone exchange 300.

Control entity 320 may be scalable. As the volume of aggregate traffic through the PPNBE 300 increases, the number of physical computing devices on which the control entity 320 resides may be increased, however, the control entity 320 may still appear as a single logical point code, and/or may be accessed by the signaling network 308 via the information in the single logical routing database. If more than one physical computing device is necessary to support the call control entity 320, the more than one physical computing device may be located locally, remotely or some combination of locally and remotely.

Likewise, in some embodiments, the single point code or routing database 205 of the PPNBE 300 may be scalable. The logical routing database 205 of the PPNBE 300 may be physically located across more than one local and/or remote computer-readable storage media entities, however, the logical routing database 205 may logically appear as a single logical routing database.

PPNBE gateways 310, 312, 315 and 316 may also be scalable. As the number of available physical connections to the PPNBE 300 desired by local service providers in a geographical area increases, a capacity of an individual PPNBE gateway may be increased. Also, if desired, additional PPNBE gateways may be added to the PPNBE 300 to provide additional trunk connections (e.g., additional communication paths) to carrier entities (302a-302e) or to new carrier entities (not pictured). The additional gateways, however, may continue to be managed by control entity 320 for servicing calls and providing features and communication services. The PPNBE 300 may maintain the same single point code for control 320 independent of the total number and size of available PPNBE gateways 310, 312, 315, 316.

The number of nodes within the private network backbone 318 may be scalable to support a desired communication traffic volume. Similar to other elements of the PPNBE 300, the nodes within the private network backbone 318 are not required to be physically co-located, but each node merely must be in communicative connection with at least one other node in the private network backbone 318.

One of ordinary skill in the art will understand that the private packet network backbone exchange 300 may provide interworking between any two carrier entities 302a, 302b, 302c, 302d, 302e. Carrier entities 302a, 302b, 302c, 302d 302e may each support a different access technology by which a CPE may access their local network for communication service, e.g., various wireless access technologies, VoIP, cable telephony, POTS, and the like. The PPNBE 300 may provide "one-hop" interworking and integration between any two carrier entities, independent of the subscriber access technology or technologies that each of the two carrier entities employs.

One of ordinary skill in the art will also understand that private packet network backbone exchange 300 may provide feature and service interworking between any two carrier entities 302a, 302b, 302c, 302d, 302e. As the PPNBE 300 includes a private network backbone 318, the PPNBE 300 may support signaling and call content bandwidth at least as large as supported by carrier entities 302a-302e within their respective internal networks. Therefore, trunk connections 305a-305e may be engineered to be higher bandwidth connections at least as large as supported by carrier entities 302a-302e, and signaling connections 308 may also be engineered to be higher bandwidth connections at least as large as supported by carrier entities 302a-302e. Thus, the lowest commonly supported bandwidth across the entire path of a call may no longer be limited to 64 and/or 65 kbps.

Features and services offered by an originating carrier entity 302a-302e that may require a higher bandwidth (e.g., Intelligent Networking features, videoconferencing, push-to-talk, gaming, and others) may be seamlessly supported by the PPNBE 300 over channels 305a-305e and 308. These features and services may be interworked to be delivered to a terminating carrier entity 302a-302e. The private packet network backbone exchange 300 may interwork features and services by hosting a consolidated database to support features and services across multiple carriers. The private packet network backbone exchange 300 may interwork features and services by accessing the databases of individual service providers regardless of the protocols used within each service provider's respective network in order to support seamless feature and service integration across multiple carriers. The PPNBE 300 thus allows a platform for feature and service transparency across disparate carrier entities 302a-302b, including those features and services requiring higher bandwidths.

The interworking of carrier entities, feature and service transparency provided by the private packet network backbone exchange 300 allows for many benefits that are currently difficult, if not impossible, to provide across multiple carriers or service providers. For instance, as the PPNBE 300 allows a wireless carrier and a local land telephony service provider to be interworked, a feature may be provided such as automatically ringing a terminating cell phone call at a land-line phone when the cell phone is in a subscriber's residence. Another example of a feature that may be supported by the PPNBE 300 may be a video-conference between multiple wireless and wired devices. A feature offered by one wireless service provider, such as "push-to-talk" or the like, may be able to be seamlessly offered across multiple wireless and even wireline service providers. Yet another example of a beneficial feature/service may be enabling an automatic connection of a wireless phone to use a Wi-Fi network if a Wi-Fi access point is readily available, and an automatic connection of the wireless phone to a traditional cell phone network if Wi-Fi is not readily available, with automatic pricing for the different modes of connection. Another feature that may be supported by the private packet network backbone exchange 300 may include "transcoder free" wireless service, where the voice or data content of a wireless call may be transcoded at the PPNBE 300 instead of at each individual cell-site of a wireless service provider, thus providing significant cost savings to the wireless provider. Many other features and services may now be possible by using the private packet network backbone exchange 300.

In some embodiments, the PPNBE 300 may service a call entirely within a single PPNBE gateway exchange itself (e.g., one of gateways 310, 312, 315 or 316). For example, a first subscriber of a specific carrier entity may call a second subscriber of the same carrier entity, where both subscribers are mapped to be serviced via exchanges connected to a same PPNBE gateway.

In one embodiment of the private packet network backbone exchange 300, the following commercial equipment may be included. Voice equipment may include:

Sonus Networks, Inc.'s Sonus PSX™ (policy server)
Sonus Networks, Inc.'s Sonus SGX (SS7 signaling gateway)
Sonus Networks, Inc.'s Sonus DSI-L0 (CDR collector)
Sonus Networks, Inc.'s Sonus DSI-L2 (Billing mediation server)
Sonus Networks, Inc.'s Sonus Insight™ EMS (element management system)
Sonus Networks, Inc.'s Sonus GSX9000 (media gateway)
Performance Technologies 6201 Mini-STP
Empirix XMS (voice monitoring system)

IP and transport equipment may include:

Force 10 (formerly Turin Networks) Traverse® 2000 (DCS)
Brocade (formerly Foundry Networks) NetIron XMR 4000 (IP router)
Brocade (formerly Foundry Networks) BigIron RX (IP router)
Brocade (formerly Foundry Networks) FastIron® Edge X448 may be used as an Ethernet switch in the private packet network backbone exchange 300.

FIGS. 4 through 9 illustrate possible calls that may be serviced by a communication network including a private packet network backbone exchange, such as embodiments of the communication network 200 of FIGS. 2A and 2B, and/or embodiments of the private packet network backbone exchange 300 of FIG. 3. Before beginning the detailed discussion of FIGS. 4-9, a discussion of terminology and conventions is in order.

In FIGS. 4 through 9, the term "on-net" is used to designate a call that both originates and terminates via an exchange of a carrier or local service provider that is directly connected to the PPNBE, such as, for example, a carrier entity represented by one of references 302a-302e of FIG. 3. The private packet network backbone exchange may be owned or operated by a PPNBE service provider that is not a carrier entity. Thus, in some cases, an "on-net" call in FIGS. 4-9 may be a call between exchanges where originating and terminating carrier entity each have an agreement with the PPNBE service provider to provide communication services. Alternatively or additionally, if the PPNBE service provider has end-customers of its own, an "on-net" call may include a call where one or both ends of the call originates and/or terminates at a CPE of an end-customer of the PPNBE service provider.

In the FIGS. 4-9, the term "off-net" is used to designate a call where one end (either origination or termination) is an exchange where the carrier entity and the PPNBE service provider have an agreement to provide communication services or an end-customer of the PPNBE servicer provider, and the other end is at an exchange that is not directly connected to the single exchange communication service switch. Thus, an "off-net" call in FIGS. 4-11 may be a call to or from an exchange owned or operated by a carrier entity that does not have an agreement with the PPNBE service provider to provide communication services.

Also in FIGS. 4-9, the term "tandem exchange" may refer to an RBOC (Regional Bell Operating Company) tandem exchange or any other tandem exchange owned or operated by a non-RBOC entity. Lastly, in FIGS. 4-9, paths or channels carrying communication traffic or content are denoted by thick, solid lines, and signaling paths are denoted by dashed lines.

Figure 4:
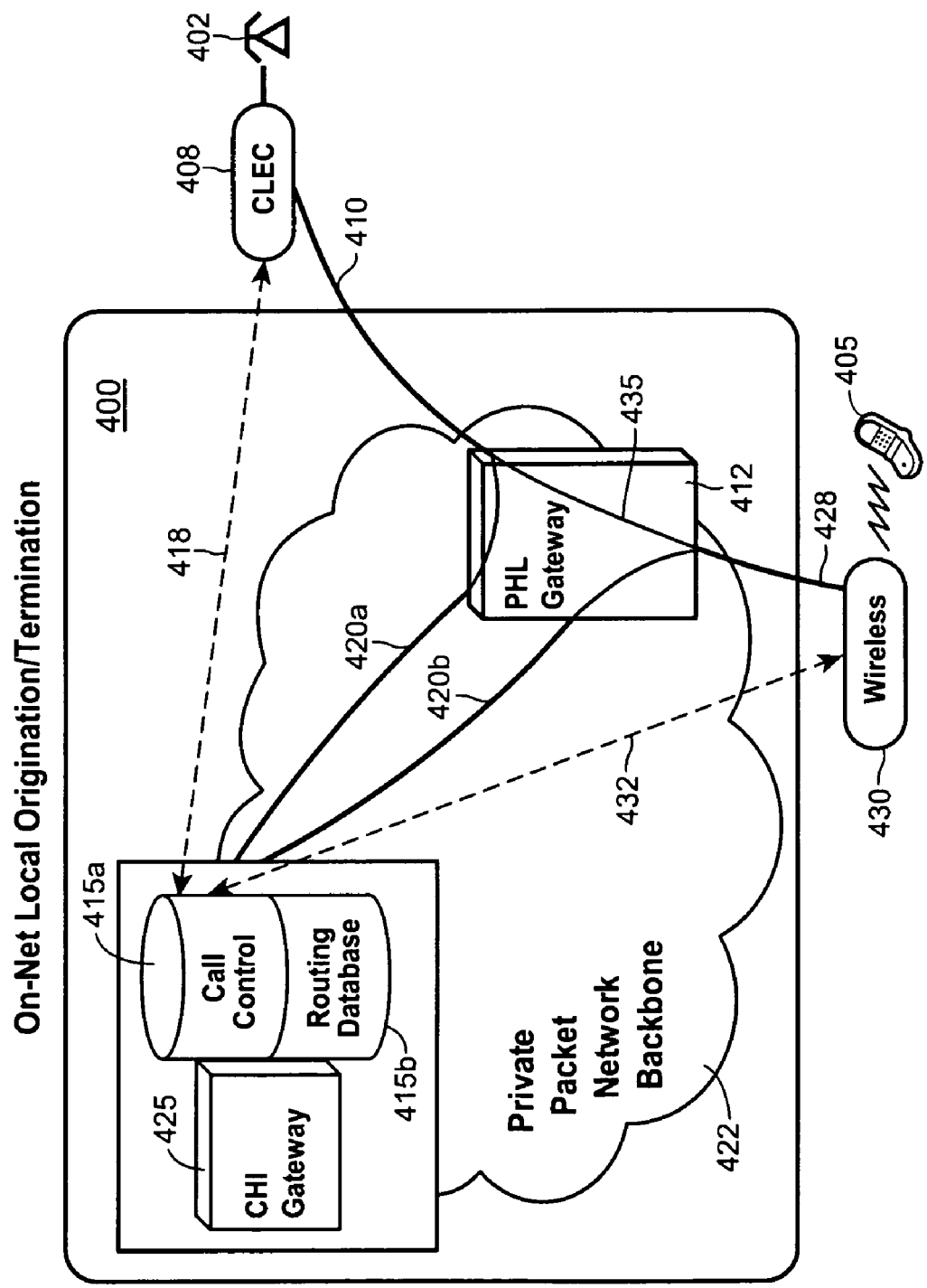
FIG. 4 illustrates an embodiment of an on-net local origination and termination in a communication network having a PPNBE.

FIG. 4 illustrates an embodiment of an on-net local origination and termination using a private packet network backbone exchange 400. In the call scenario illustrated by FIG. 4, a Competitive Local Exchange Carrier (CLEC) subscriber, such as a residential landline customer, may use a landline telephone 402 to originate a voice call to a wireless subscriber at a wireless device 405. The landline telephone 402 and the wireless device 405 may be in the same LATA (Local Access and Transport Area).

Call content of the originating call from the landline telephone 402 may be routed from the originating CLEC switch or exchange 408 to the PPNBE 400 via a logical trunk group 410 or similar connection. The logical trunk group 410 may terminate at a PPNBE gateway (in FIG. 4 designated by the "PHL Gateway" 412) of the PPNBE 400. The PHL gateway 412 may be configured to service exchanges or switches in the LATA of which the landline telephone 402 and the wireless device 405 are both a part, although the PHL gateway 412 may be configured to serve other areas of a country or nation simultaneously.

Signaling corresponding to the originating call may be received at a logical call control entity 415 of the PPNBE 400 via a signaling connection 418. In this embodiment, the logical call control entity 415a is illustrated as being physically co-located with a logical routing database 415b of the PPNBE 400, but as previously discussed, physical co-location of the logical call control 415a and the logical routing database 415b is not necessary.

In some embodiments, the call content may be backhauled (reference 420a) from the PHL gateway 412 through a private packet network backbone 422 to another PPNBE gateway (in FIG. 4 depicted as the "CHI gateway" 425). The call control 415a, in conjunction with the routing database 415b, may determine a terminating gateway for the call (in this scenario, the PHL gateway 412), and may route the call content back through the private packet network backbone 422 (reference 420b) to the terminating gateway. The terminating side of the call content may then exit the PPNBE 400 via a trunk or other connection 428 to a wireless service switch or exchange 430. The wireless exchange 430 may then deliver the call content to the terminating CPE wireless device 405.

With regard to backhauling, in some embodiments, any call received at an "entry" gateway (such as the PHL gateway 412) may be backhauled to a central designated gateway (such as the CHI gateway 425). By backhauling call traffic or content to a central gateway, the architecture of the PPNBE 400 allows the PPNBE 400 to deterministically route each and every call. The call content of each and every call may be routed within switch 400 from an "entry" gateway, backhauled to the central gateway, and to an "exit" gateway. In the on-net local origination/termination embodiment of FIG. 4, for example, the "entry" and "exit" gateways are both PHL gateway 412. Using this backhaul architecture allows call quality, set-up time and metrics to be efficiently controlled and optimized within single exchange communication service switch 400.

In other embodiments, however, rather than backhauling the call content to and from the CHI gateway 425 (as shown by references 420a and 420b), upon determination of the termination gateway, the logical call control entity 415a may instead direct the PPNBE 400 to route the call content entirely within the PHL gateway 412 itself, as shown by reference 435. Optimizing a direct connection entirely within a particular gateway (as illustrated by the reference 435) when possible may help to relieve traffic congestion in the private packet network backbone 422 and may shorten a delivery time of call content.

The signaling for the termination side of the call may be sent by the logical call control entity 415a to the wireless service exchange 430 (as designated by reference 432). In some embodiments, the originating signaling 418 and the terminating signaling 432 may travel over a signaling network (not pictured), such as an SS7 network or other third party network. In these embodiments that use a separate signaling network, the logical call control entity 415a and/or the logical routing database 415b of the PPNBE 400 may appear to the separate signaling network as a single logical point code. Direct physical signaling paths between the CLEC 408 and the PPNBE 400 (reference 418) and between the PPNBE 400 and the wireless exchange 430 (reference 432) may be established via the separate signaling network.

In some other embodiments, the references 418 and 432 may represent logical signaling paths between the CLEC 408 and PPNBE 400 and between the PPNBE 400 and the wireless switch 430, respectively. Corresponding physical signaling paths, however, may follow receiving signaling messages at the PHL gateway 412 and routing the signaling messages via the private packet network backbone 422 to and from the logical call control entity 415a (references 420a and 420b). For these embodiments, control of the call may still be maintained by the logical call control 415a with the private packet network backbone 422 and the PHL gateway 412 merely serving as an alternative signaling route to an SS7 or other external signaling network.

Note that in the embodiment of FIG. 4, the logical control 415a and the CHI gateway 425 are co-located in the same physical location. In other embodiments, the call control entity 415a may be located in a different physical location from the CHI gateway 425 or from any other PPNBE gateway. CHI call control 415a is not required to be co-located with any other internal equipment of the PPNBE 400. Similarly, for other scenarios shown in subsequent figures, the logical call control entity 415a is shown as being physically co-located with a gateway, but is not required to be physically co-located.

Of course, in FIG. 4, the originating and the terminating exchanges being a CLEC 408 and a wireless exchange 430 are exemplary only, and are not meant to limit types of calls or service providers. Any service provider having a service agreement with the PPNBE provider and using any local access technology may be party to an on-net call.

Figure 5:
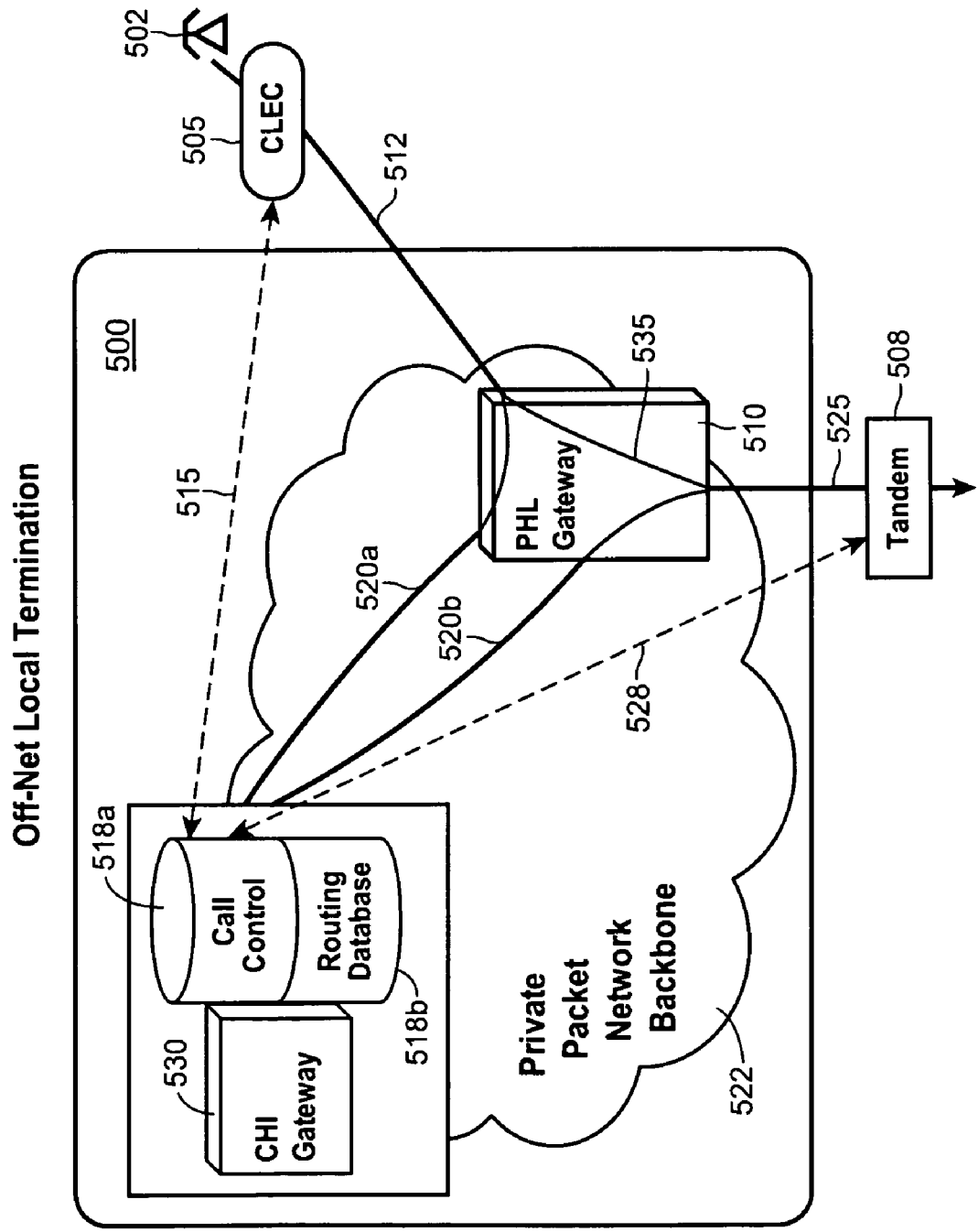
FIG. 5 illustrates an embodiment of an off-net local termination in a communication network having a PPNBE.

FIG. 5 illustrates an embodiment of an off-net local termination using a private packet network backbone exchange 500. This call scenario may occur, for example, when a subscriber 502 of a CLEC exchange or switch 505 connected to the PPNBE 500 originates a local, intra-LATA call destined for at a CPE (not shown) whose service provider does not have a service agreement with the PPNBE provider. In order to reach the terminating CPE, the terminating side of the call may be routed via a tandem exchange 508. As the call is a local intra-LATA call, both the CLEC exchange 505 and the tandem exchange 508 may be serviced by a same PPNBE gateway (in this scenario, the "PHL Gateway" 510). In effect, the scenario illustrated by FIG. 5 is similar to the on-net call scenario of FIG. 4, but with one end of the call being replaced by a tandem exchange 508 in order to access the off-net CPE.

The originating side of the call may be similar to the originating side of the "on-net" call illustrated in FIG. 4. The originating call content may be received at the PHL gateway 510 via a trunk group 512, and the originating signaling may be received (reference 515) at a logical call control entity 518a in connection with a logical routing database 518b.

The logical call control 518a may determine that access to the calling party 502 and the called party are both via the PHL gateway 510. The logical call control 518a may route the call content to exit the PPNBE 500 at the PHL gateway 510 over a trunk group 525 connected to the tandem exchange 508. The tandem exchange 508 may then route the call content in a typical fashion to the terminating CPE (not shown) or to another exchange or switch through which the CPE may be reached. Call termination signaling 528 may occur between the logical call control entity 518a and the tandem exchange 508.

In some embodiments, similar to FIG. 4, the call content may be backhauled (references 520a, 520b) through a private packet network back bone 522 to and from a central PPNBE gateway 530. In some embodiments, the call content may not be backhauled (references 520a, 520b) but instead may be directly connected internally to the PHL gateway 510, such as shown by reference 535.

Also similar to FIG. 4, the logical originating and terminating signaling paths 515 and 528 may each physically traverse through a signaling network (not shown), or may each physically traverse via internal paths 520a and 520b of the PPNBE 500 through a private backbone network 522 to and from the logical call control 518a.

An off-net origination may be a call that originates from a party whose service provider is not a partner of the PPNBE service provider, but terminates via an exchange owned or operated by a PPNBE service provider partner. One of ordinary skill in the art will understand that an off-net origination may generally operate in reverse of the off-net termination scenario shown in FIG. 5. For example, the originating side of the call may be received at the PHL gateway 510 from the tandem exchange 508, and the terminating side of the call may be delivered by the PHL gateway 510 to the CLEC 505.

Of course, the on-net exchange 505 shown in FIG. 4 being a CLEC is exemplary only, and is not meant to limit the types of calls or partner service providers. Any service provider using any local access technology and partnering with the PPNBE provider may be party to an off-net call.

Figure 6:
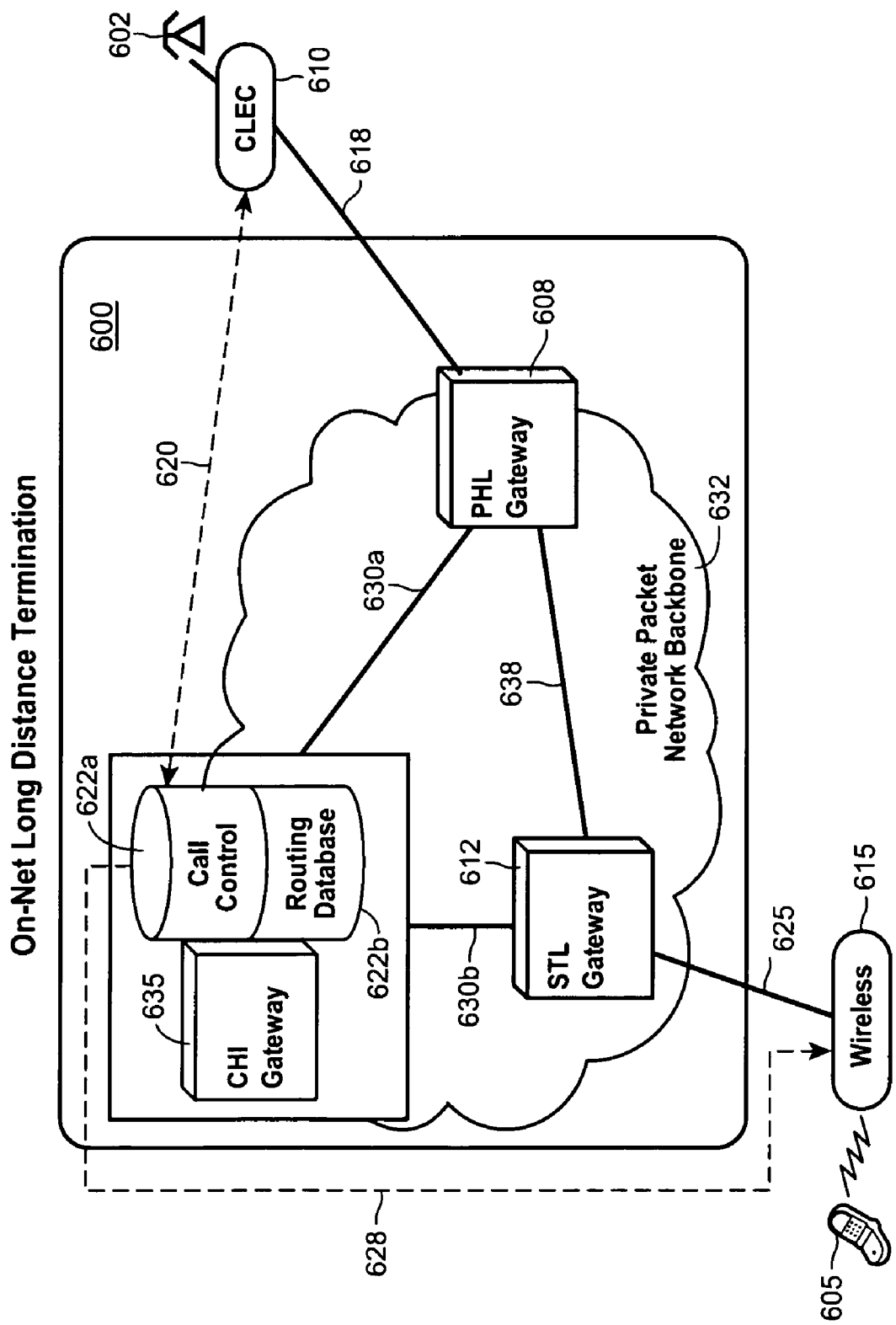
FIG. 6 illustrates an embodiment of an on-net long distance termination in a communication network having a PPNBE.

FIG. 6 illustrates an embodiment of an on-net long distance termination using a private packet network backbone exchange 600. In this example, a CLEC landline subscriber 602 may originate a long distance call to a wireless subscriber 605. The landline subscriber 602 and the wireless subscriber 605 may be in different LATAs, and thus may be accessed via different PPNBE gateways of the PPNBE 600. Accordingly, a first PPNBE gateway (in FIG. 6, the "PHL gateway" 608) may be connected to a CLEC exchange 610 via which the CLEC subscriber 602 may be accessed, and a second PPNBE gateway (in FIG. 6, the "STL gateway" 612) may be connected to a wireless switch or exchange 615 via which the wireless subscriber 605 may be accessed.

The originating side of the call may be similar to the scenarios of FIGS. 4 and 5. Originating call content may be received at the PHL gateway 608 via a logical trunk group 618, and originating signaling may be received (reference 620) at a logical call control entity 622a in connection with a logical routing database 622b.

The logical call control 622a may determine that the called party 605 is on-net and may be accessed by the STL gateway 612. The logical call control 622a may route the call content to exit the PPNBE 600 at the STL gateway 612 over a logical trunk group 625 connected to the wireless exchange 615. The wireless exchange 615 may then route the call content to the wireless subscriber 605. Call termination signaling 628 may occur between the logical call control entity 622a and the wireless exchange 615.

In some embodiments, similar to FIG. 4, the call content may be routed (references 630a, 630b) through a private packet network back bone 632 to and from a central PPNBE gateway 635. The central PPNBE gateway 635 may or may not be physically co-located with the logical call control entity 622a and/or the logical routing database 622b. In some embodiments, the call content may be directly routed through the private packet network backbone 632 from the originating PPNBE gateway 608 directly to the terminating PPNBE gateway 612, such as shown by reference 638.

The logical originating and terminating signaling paths 620 and 628 may each physically traverse through a signaling network (not shown), or may each physically traverse through the private backbone network 632 to and from the logical call control 622a, by backhauling via paths 630a and 630b, or by direct routing via path 638.

Of course, the originating and terminating on-net exchanges 610 and 612 being illustrated as CLEC and wireless exchanges in FIG. 6 are exemplary only, and are not meant to limit the types of calls or the types of service providers. Any service provider using any local access technology and having a service agreement with the PPNBE provider may be party to an on-net long distance call. Also, on-net long distance calls may be routed between any PPNBE gateways in the PPNBE 600 as required by the calling and called parties. In some embodiments, a particular on-net long distance call may even be routed within a single particular PPNBE gateway, for instance, if the single particular PPNBE gateway services more than one LATA.

In fact, each PPNBE gateway 608, 612, 635 may be configured to service one LATA, several LATAs, or portions of one or more LATAs. In some embodiments, service supporting a particular LATA may be split across multiple PPNBE gateways. The exact engineering and configuration of how PPNBE gateways map to LATAs or areas of service may be highly flexible and may be determined by the PPNBE service provider. Irrespective of the number of PPNBE gateways and their service areas, though, the private packet network backbone exchange 600 still may maintain a presence as a single logical routing database 622a, 622b or point code to external exchanges. In this fashion, the PPNBE 600 may be easily configurable to support varying levels of traffic needs in various areas. Indeed, in some embodiments, the PPNBE 600 may be configured to support an entire country's communication traffic using one logical routing database or logical point code 622a, 622b.

Note that the on-net long distance termination of FIG. 6 may be completed from the originating exchange 610 to the terminating exchange 615 with only "one-hop." That is, the on-net long distance call only traverses through the PPNBE 600 for call completion without traversing through any other tandem or long distance exchanges. Thus, issues of call degradation and feature transparency for the long distance call may be deterministically mitigated. Between the originating 610 and the terminating 615 exchanges, the end-to-end long distance call only traverses one exchange 600 operated by a single service provider—the PPNBE service provider—and thus, the PPNBE 600 may be easily engineered to support over all call quality and feature support. Current end-to-end long distance calls require traversing multiple exchanges supported by multiple service providers, and in some cases may even require traversing a public network such as the Internet. In either case, overall end-to-end quality and feature control may not be managed in as comprehensive of a fashion as provided by the private packet network backbone exchange 600.

Figure 7:
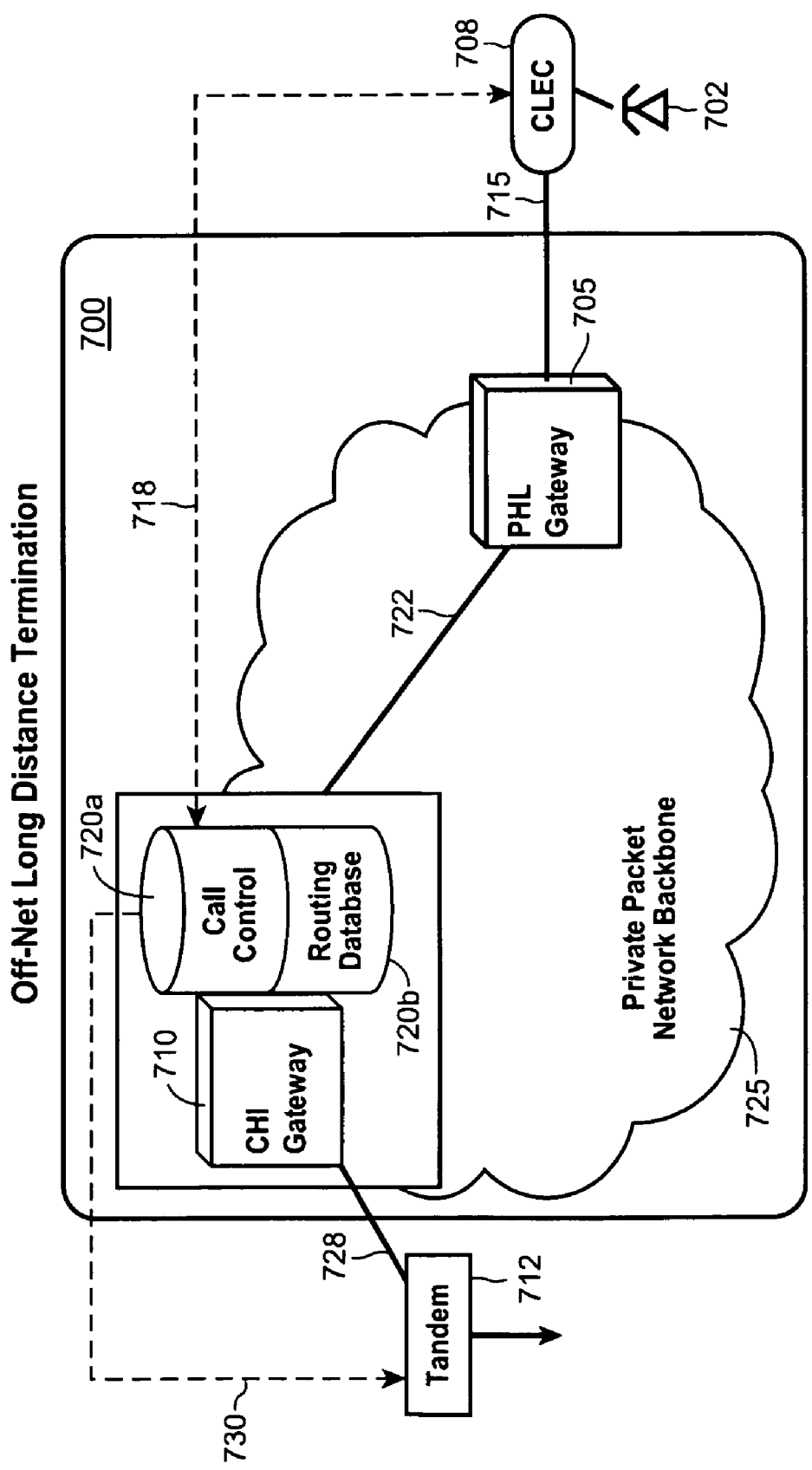
FIG. 7 illustrates an embodiment of an off-net long distance termination in a communication network having a PPNBE.

FIG. 7 illustrates an embodiment of an off-net long distance termination using a private packet network backbone exchange 700. In this call flow, an on-net CLEC landline subscriber 702 of carrier entity may originate a long distance call to an off-net called party (not shown). The CLEC may have an agreement to provide service in partnership with the PPNBE service provider, but the service provider of the called party may not, so the long distance call must terminate off-net of the PPNBE 700. In the scenario illustrated by FIG. 7, a PPNBE gateway (in this example, "PHL gateway 705") may be connected to a CLEC switch or exchange 708 through which the landline subscriber 702 may be accessed, and a second PPNBE gateway (in this example, "CHI gateway" 710) may be connected to a tandem exchange 712 through which the long distance call must be routed to reach the off-net called party.

The originating side of the call may be similar to the originating side of the local "off-net" call illustrated in FIG. 5. The originating call content may be received at the PHL gateway 705 via a trunk group 715, and the originating signaling may be received (reference 718) at a logical call control entity 720a in connection with a logical routing database 720b in the PPNBE 700.

The logical call control 720a may determine that the called party is off-net and must be accessed via the tandem exchange 712 serviced by the CHI gateway 710. (Of course, the CHI gateway 710 in this scenario is exemplary, and the call may be routed to an appropriate PPNBE gateway in the PPNBE 700 that is connected to the specific tandem via which the called party may be accessed.) The logical call control 720a may route the call content via an internal path 722 in a private packet network backbone 725 to the CHI gateway 710. The call content may then exit the PPNBE 700 via a trunk group 728 connected between the CHI gateway 710 and the tandem exchange 712. The tandem exchange 712 may then route the call content in a typical fashion to the CPE of the called party (not shown) or to an exchange or switch through which the CPE may be reached. Call termination signaling 730 may occur between the logical call control entity 720a and the tandem exchange 712.

Similar to FIG. 5, the logical originating and terminating signaling paths 718 and 730 may each physically traverse through a signaling network (not shown), or may each physically traverse the PPNBE 700 via an internal path 722 in the private backbone network 725 under the management of the logical call control entity 720a.

An off-net long distance origination may be a long distance call that originates from a party whose service provider is not a partner of the PPNBE service provider, but terminates via an exchange owned or operated by a PPNBE service provider partner. One of ordinary skill in the art will understand that an off-net long distance origination may generally operate in the reverse of the off-net long distance termination scenario shown in FIG. 7. For example, the originating side of the call may be received at the CHI gateway 710 from the tandem exchange 712, and the terminating side of the call may be delivered by the PHL gateway 705 to the CLEC 708.

Again, as in previous figures, the originating exchange 708 shown in FIG. 7 being a CLEC is exemplary only, and is not meant to limit the types of calls or partner service providers. Any service provider using any local access technology and partnering with the PPNBE provider may be party to an off-net long distance call.

Figure 8:
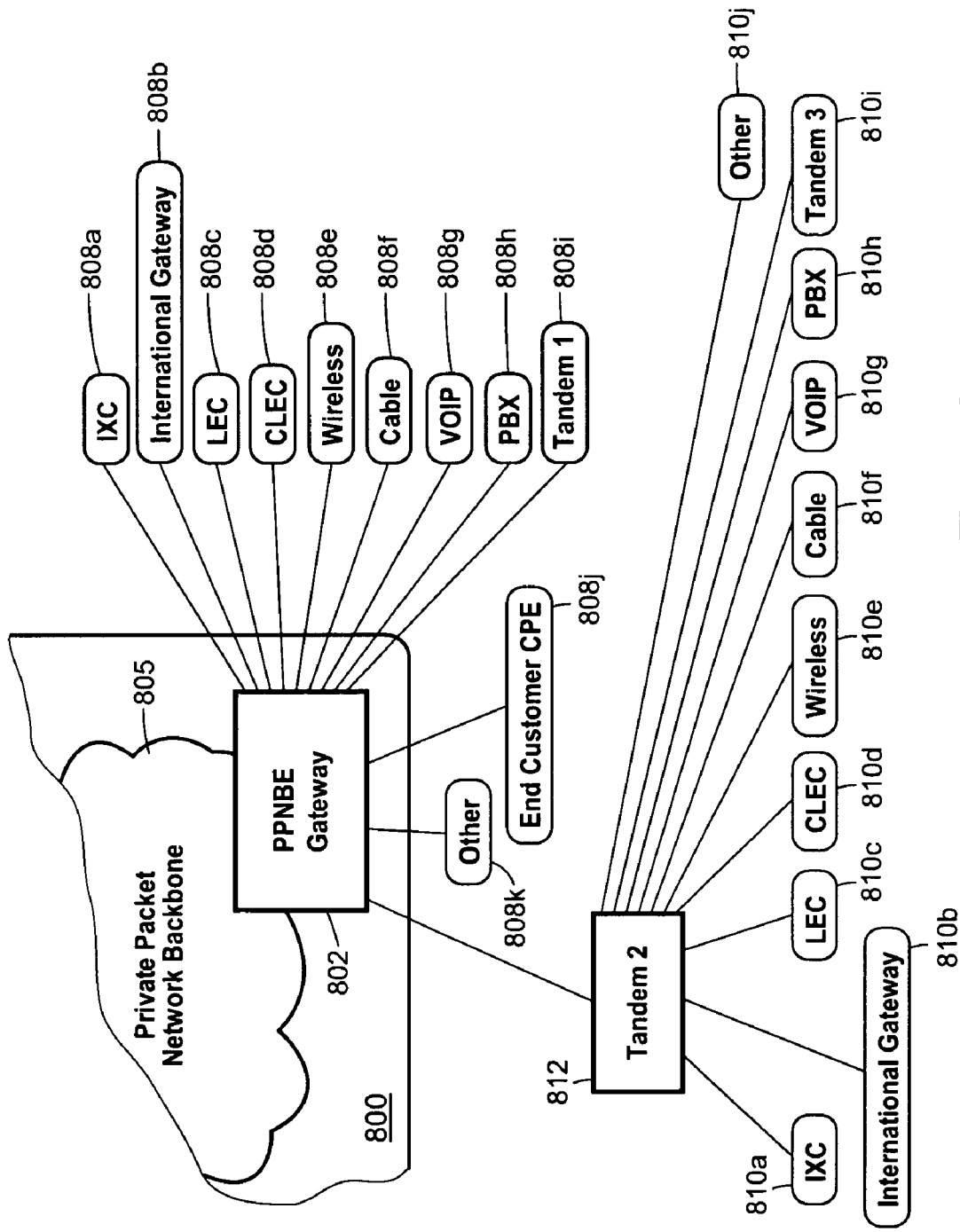
FIG. 8 illustrates possible service provider entities that may be on-net or off-net to a private packet network backbone exchange.

FIG. 8 illustrates possible entities that may be "on-net" to a private packet network backbone exchange 800. FIG. 8 illustrates a close-up of a portion of the PNPBE 800, including a PPNBE gateway 802 connected to a private packet network backbone 805 and a set of communications equipment 808a-808k that may be in connection with the PPNBE 800. Each of the set of communications equipment 808a-808k may be owned and/or operated by a partnering entity or service provider. In FIG. 8, possible partnering entities may include one or more of:

an inter-exchange carrier 808a,
an international gateway provider 808b,
a Local Exchange Carrier 808c,
a Competitive Local Exchange Carrier 808d,
a wireless service provider 808e,
a cable service provider 808f,
a VoIP service provider 808g,
a PBX owner or operator 808h,
a tandem exchange provider 808i,
an end-customer of the PPNBE service provider 808j, or
an other communications provider 808k.

Each possible service provider 808a-808k may have a direct connection between a PPNBE gateway 802 and their respective communications equipment. Of course, not all possible service providers 808a-808k are required to be connected to the same PPNBE gateway 802. FIG. 8 merely provides an illustrative group of possible service providers 808a-808k that may each have an "on-net" relationship with the PPNBE service provider, and corresponding connections between their respective communications equipment and at least one PPNBE gateway of the PPNBE 800. FIG. 8 is not meant in any way to limit the number and location of any of the corresponding connections.

FIG. 8 also illustrates types of possible service providers 810a-810j in an "off-net" arrangement. Equipment or exchanges of "off-net" service providers that are not in partnership with the PPNBE service provider may be required to be accessed in a traditional fashion, that is, via a corresponding tandem exchange 812. Any calls originating from or terminating to equipment owned and operated by service providers 810a-810j must necessarily be accessed by the PPNBE 800 via the corresponding tandem exchange 812.

For illustration purposes, only one tandem exchange 812 is shown in FIG. 8, however, the connections of the set of equipment of each service provider 810a-810j may be dispersed across one or more different tandem exchanges. Also, the one or more different tandem exchanges may be connected to the PPNBE 800 via one or more different PPNBE gateways. Members of the set of "on-net" service provider equipment and the members of the set of "off-net" service provider equipment are not required to all be connected to a same PPNBE gateway 802; the configuration shown in FIG. 8 is for brevity of illustration only.

In this manner, the private packet network backbone exchange 800 may be easily and fully integrated into a network of partnering and non-partnering service providers. A few call flow examples may illustrate the flexibility of the private packet network backbone exchange 800.

In a first example, consider a toll-free "800" call originating at a VoIP end-user where the VoIP service provider is in partnership with the PPNBE service provider. Thus, the originating call may enter the PPNBE 800 via a VoIP system gateway 808g. If the desired 800 service is accessed via an on-net IXC such as IXC 808a, then the call may be routed on-net through the PPNBE 800 to terminate at the IXC 808a. On the other hand, if the desired 800 service is accessed via an off-net IXC such as IXC 810a, then the call may be routed off-net through the PPNBE 800 to terminate at a corresponding tandem exchange 812, which then may forward the call on to the servicing IXC 810a.

In another example, if an off-net IXC subscriber calls a subscriber of an on-net CLEC end-customer, the originating IXC 810a may send the call to an access tandem 812, which then may in turn route the call to the PPNBE 800. The PPNBE 800 may determine that the end-customer is an on-net CLEC customer, and then may route the call directly to a CLEC exchange 808d.

In yet another example, consider a call originating from a Company "A" that has a PBX 808h. Company A may have a service agreement with the PPNBE service provider to provide all of its communication services. If the originating call is destined for an end-customer of the PPNBE service provider, the call may be received at the PPNBE 800 from the PBX 808h, and then routed on-net to a CPE of the end-customer 808j. If the originating call is destined for a customer of a LEC and the LEC does not have a service agreement with the PPNBE service provider, the call may again received at the PPNBE 800 from the PBX 808h. In this scenario, however, the call may then be routed off-net via a corresponding tandem 812 to access an exchange of the LEC 810c via which the call may be terminated.

One skilled in the art may easily extrapolate a plethora of other possible on-net and off-net calls that may be supported by the private packet network backbone exchange 800. Furthermore, not only does the private packet network backbone exchange 800 support numerous types of on-net and off-net call flows, but the private packet network backbone exchange 800 may also support any and all types of possible on-net and off-net call flows that have some degree of time overlap. For instance, the PPNBE 800 may essentially simultaneously service both a local on-net call and a long distance call.

Note that calls may be serviced with "one-hop," e.g., without traversing any exchanges other than the PPNBE 800. This characteristic of the PPNBE 800 affords numerous benefits to partnering service providers. In addition to call quality and feature support as previously discussed, engineering and management of resources may be simplified. In order to have complete access to intra- and inter-LATA exchanges, service providers no longer need to pair-wise connect to multiple tandems and/or inter-exchange carriers, each with a different point code, and each requiring potentially multiple trunk groups that must be sized, engineered and managed. Instead, with embodiments disclosed in the present application, a service provider may connect only to the PPNBE 800 and yet still be enabled to access virtually all other inter- and intra-LATA exchanges. With the single connection to the PPNBE 800, a service provider need only manage one point code (the point code of the PPNBE 800) and in some cases, only one logical trunk group between its exchange or communications equipment and the PPNBE 800. Routing and resource management is greatly simplified.

Figure 9:
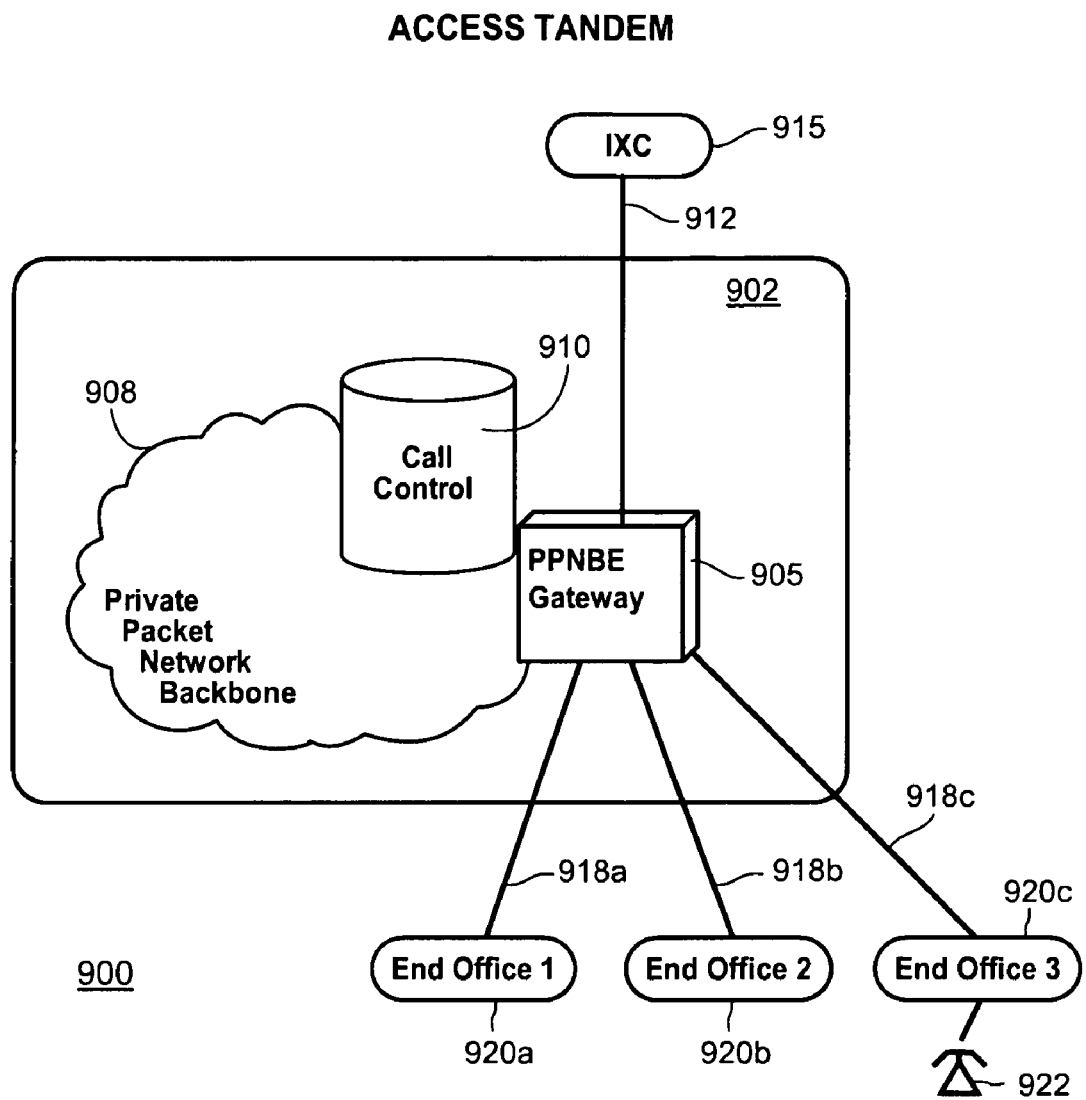
FIG. 9 depicts an embodiment of a PPNBE serving as an access tandem.

FIG. 9 illustrates an example of these benefits. FIG. 9 depicts an embodiment of a communications network 900 including a private packet network backbone exchange 902 serving as an access tandem. The private packet network backbone exchange 902 may be an embodiment of the PPNBE 202 as illustrated in FIGS. 2A and 2B and/or an embodiment of the PPNBE 300 illustrated in FIG. 3. The PPNBE 902 may include, inter alfa, one or more PPNBE gateways 905, a private packet network backbone 908, and a logical call control entity 910. In this example, the PPNBE 902 may connect to a single logical IXC trunk group 912 between the PPNBE gateway 905 and an IXC exchange 915, and may connect to one or more logical local trunk groups 918a-918c between the PPNBE gateway 905 and different end-office exchange 920a-920c.

In some embodiments of FIG. 9, the PPNBE 902 may serve as a terminating access tandem for subscribers of end-offices 920a-920c. The span of the connections 918a-918c to the end-offices 920a-920c may cover a pre-determined population of codes. In some embodiments, for a terminating call, the IXC 915 may override an only route supported by a Local Exchange Routing Guide (LERG). In some embodiments, for the terminating call, the IXC 915 may use a route selected from a plurality of routes supported by the LERG. For example, one of the end-offices 920a-920c or its controlling entity may have designated a chosen route from the plurality of routes supported by the LERG. In either case, instead of routing calls destined to end-offices 920a-920c via tandem switches, the IXC 915 may route the calls to the PPNBE 902 via the trunk group 912. The PPNBE 902 may then complete the terminating calls to the appropriate end-office and subscriber, such as terminating a call to a subscriber 922 accessible via the end-office 920c. The PPNBE 902 may provide the end-office 920c with a meet point billing EMI (Exchange Message Interface) record to facilitate billing of common trunk and access charges to the IXC customer of record.

Note that in FIG. 9, unlike in current telephony architecture, the IXC 915 is no longer required to connect to multiple tandems in order to reach end-offices 920a-920c. Rather, the IXC 915 may connect to only a single exchange (the PPNBE 902) in order to have access to the end-offices 920a-920c. Thus, the IXC 915 may only need to have knowledge of the point code or logical routing database of the PPNBE 902 and no other exchanges. The IXC 915 may only need to administer a single destination point code for tandem access service.

Also, the IXC 915 may only need to administer a single or only IXC trunk group 912 to the tandem access 902 for tandem access service. As the PPNBE is scalable, the only IXC trunk group may not be limited in a total number of members. Additional trunk group members may easily be added to accommodate any additional load. The IXC 915 is thus enabled to access all end-offices 920a-920c while only needing to administer only a single logical trunk group 912.

With conventional access tandem configurations, however, the IXC is required to have a different IXC trunk group to each different access tandem. Each different IXC trunk group may be limited in a total number of members. Thus, an increase in communication traffic capacity may require an addition of more trunk groups to sufficiently service the capacity increase, that in turn, may increase administration and maintenance costs. Further, each conventional access tandem may be limited to a maximum number of end-offices for which it may provide service, based, in part, on a legacy architecture of tandem access switches. However, by using a PPNBE 902 as an access tandem as illustrated in the embodiment shown by FIG. 9, these disadvantages may be easily overcome.

Moreover, in addition to administration benefits, by using the PPNBE 902 as an access tandem, the IXC 915 service provider may realize cost benefits as well. With the traditional network of conventional access tandems, each access tandem in the network may charge the IXC for mileage, switching, and distance. By consolidating the network of conventional access tandems into a single PPNBE access tandem 902 functionality with the single or only IXC trunk group 912, significant cost savings may be realized by the IXC service provider.

One skilled in the art will realize that the PPNBE 902 of FIG. 9 may also be used as an originating access tandem. In this scenario, each end-office 920a-920c may override a recommendation of the LERG (or, may use a chosen route from a plurality of routes indicated in the LERG) and instead may route outgoing access calls destined for the IXC 915 to the PPNBE 902 instead of to a designated access tandem. For example, an origination from the LEC subscriber 922 may be routed from the end-office 920c via the local trunk group 918c to the PPNBE 902, and the PPNBE 902 may then route the call over the single IXC logical trunk group 912 to the IXC 915. The span of interconnections 918a-918c may cover a pre-determined population of end-office subscribers. Using the PPNBE 902 as an originating access tandem incurs similar benefits to using the PPNBE 902 as a terminating access tandem, including resource management and cost benefits.

Figure 10:
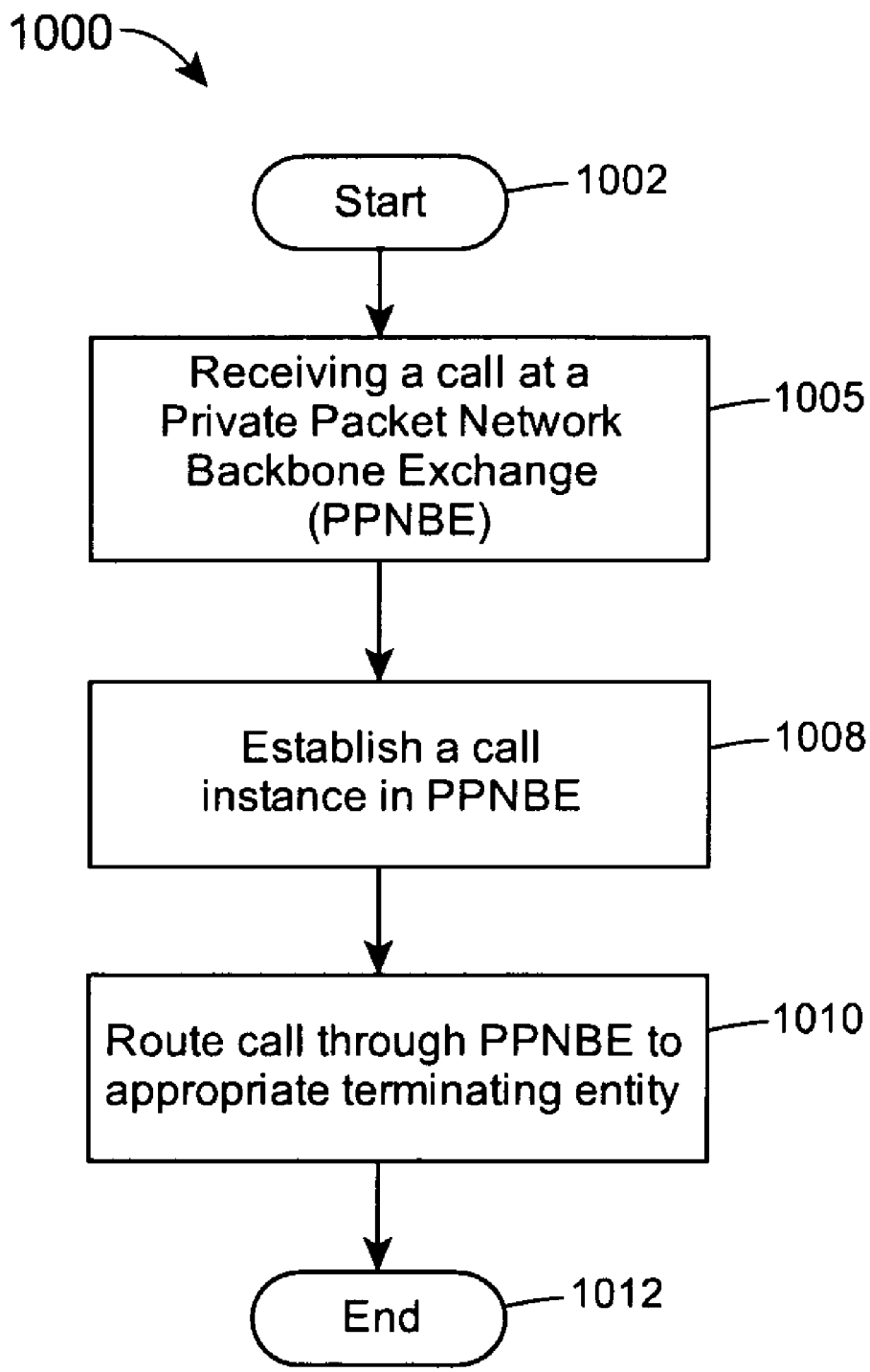
FIG. 10 illustrates an embodiment of a method for providing communication service between a first exchange and a second exchange using a PPNBE.

FIG. 10 illustrates an embodiment of a method 1000 for providing communication service using a private packet network backbone exchange. The method 1000 may operate in conjunction with embodiments of the private packet network backbone exchange described in FIGS. 2A, 2B and/or FIG. 3. The method 1000 may also operate in conjunction with embodiments of FIGS. 4-9. At the start (block 1002), a private packet network backbone exchange may receive an originating call (block 1005). In some embodiments, the originating call may be received at a first PPNBE gateway from an originating exchange. The originating call may be a voice call, a data call, or a combination of voice and data. The originating call may be received via any known communication protocol, e.g., in-band, out-of-band, SS7, VoIP, TDM, SIP, or other communications protocols.

The originating exchange may be owned, operated, and/or controlled by a carrier entity, such as one of the carrier entities 302a-302e of FIG. 3. The originating exchange may be, for example, a LEC, a cellular or wireless switch, a gateway of a local carrier system such as a VoIP or cable telephony gateway, a tandem exchange, a PBX, or any other communications equipment such as discussed with respect to FIG. 8. The originating exchange may use a local access technology with which its respective subscribers connect to the originating exchange's network. The local access technology may be, for example, a physical connection, wireless connection of any frequency band, cable telephony, VoIP, WiFi, WiMAX, POTS, or any other known access technology.

In another embodiment, the originating call may be received at the first PPNBE gateway directly from a first CPE, such as a landline phone, a wireless device, a computer, or any other type of CPE enabled to originate and/or terminate communication calls. In this embodiment, a customer or end-user associated with the first CPE may be a direct subscriber of a PPNBE service provider that owns and/or operates the private packet network backbone exchange.

The first PPNBE gateway may convert the originating call into a format or protocol used internal to the private packet network backbone exchange. In some embodiments, the first PPNBE gateway may convert the call into a public or private IP protocol format.

At block 1008, a call instance corresponding to the received originating call may be established in the PPNBE. The call instance may be established, for example, by a logical call control entity of the PPNBE. The logical call control entity, in conjunction with a logical routing database of the PPNBE, may create a call record corresponding to the originating call, determine any necessary information associated with the originating call (such as routing, billing, call features, and other necessary call information), coordinate the routing of the originating call content through the PPNBE, and record events associated with the originating call. The logical call control entity may also perform any necessary signaling with the originating and terminating exchanges or entities required for the call.

As previously discussed with respect to FIGS. 2A, 2B and 3, the logical call control entity may physically reside on one or more computing devices, such as on one or more servers or on a computing cloud. A portion of the one or more computing devices may be directly, locally and/or remotely networked. The logical routing database may be in connection with the logical call control entity and may physically reside on one or more computer storage media devices, such as a database server or computing cloud. A portion of the one or more computer-readable storage media devices may be directly, locally or remotely linked. The one or more computing devices on which the logical call control entity is supported may or may not be partially or entirely physically co-located with the one or more computer-readable storage media devices. Each of the one or more computing devices and the one or more computer-readable storage media devices may or may not be partially or entirely physically co-located with the first, second, or any PPNBE gateway.

At block 1010, the originating call may be routed through the PPNBE to a corresponding terminating entity. In some embodiments, the corresponding terminating entity may be a second PPNBE gateway in connection with a terminating exchange corresponding to a destination of the originating call. The terminating exchange may be an exchange owned, operated, and/or controlled by a carrier entity, such as carrier entities 302a-302e of FIG. 3. The terminating exchange may be, for example, a local exchange, a cellular or wireless switch, a gateway of a local carrier system such as gateways of cable telephony, wired, or wireless VoIP systems, WiMAX, WiFi, a tandem exchange, a PBX, or the like. The terminating exchange may use a local access technology with which its respective subscribers may connect to the terminating exchange's network. The local access technology may be, for example, a physical connection, wireless connection of any frequency band, cable telephony, VoIP, POTS, or other known access technology. The local access technology used by the terminating exchange may be the same or different as the local access technology used by the originating exchange.

In some embodiments, the corresponding terminal entity may be the second PPNBE gateway in connection with a second CPE. The second CPE may be, for example, a landline phone, a wireless device, a computer, or any other type of CPE enabled to originate and/or terminate communication calls. In this embodiment, a customer or end-user associated with the second CPE may be a direct subscriber of the PPNBE service provider.

At the block 1010, the call may be routed through the, for instance, by routing the call content of the originating call from the first PPNBE gateway to the second PPNBE gateway. The originating call may be routed between the originating and the terminating exchanges using "one-hop," that is, the routed call may be routed between the first and terminating exchanges across the PPNBE without traversing any other intermediate exchanges. In some embodiments, such as when the PPNBE internally uses an IP protocol, the call content of the originating call may be contained in packets defined by the IP protocol. The packetized call content may be delivered across the PPNBE via the IP protocol from the first PPNBE gateway to the second PPNBE gateway.

In some embodiments, if the logical call control entity is not physically co-located with the first or the second PPNBE gateways, the originating call content may be backhauled from the first PPNBE gateway to a physical location of the logical call control entity (e.g., one or more servers or computing devices physically supporting the logical call control entity) and then directed to the second PPNBE gateway. In another embodiment, the originating call content may not be backhauled at all, but instead may be directly routed through the PPNBE from the first PPNBE gateway to the second PPNBE gateway.

In some embodiments, the first and the second PPNBE gateways may be determined to be a same PPNBE gateway. This embodiment may occur if both the first and the terminating exchanges or CPEs are homed on the same PPNBE gateway. In this embodiment, the call content may be routed entirely internal to the same PPNBE gateway itself.

Logical signaling paths may be established between the logical call control entity and each of the originating and terminating exchanges. Actual physical signaling paths may use an external signaling network such as an SS7 or other third party network. Actual physical signaling paths may also be "in-band," where call signals may traverse the internal private packet network between the logical call control entity and each of the originating and terminating exchanges.

The method 1000 may use the private packet network backbone exchange to establish call connections between any two exchanges that use any local access technology for connecting to their respective subscribers. The private packet network backbone exchange may be owned, operated and/or controlled by an entity different than the entity that owns, operates and/or controls the originating exchange and a different than the entity that owns, operates and/or controls the terminating exchange. The PPNBE may be identified to other exchanges by a single point code, or may be accessed via information in a single logical routing database. The PPNBE may serve a large geographic area, and in some cases, may serve an entire country's communication traffic.

The method 1000 may include providing transparency for call features and/or call services. Call features may include features available to end-users, such as caller ID, three-way calling, unlimited roaming, voice mail, call screening, and text messaging, to name a few. Call services may include services available to end-users or service providers, such as 800/toll-free calls, calling card accounts, number portability, location or time based routing, intelligent network services, and the like.

In particular, the method 1000 may include enabling the logical call control entity and any protocol used internally to the private packet network backbone exchange to support any known call feature and/or call service. For example, the logical call control entity may be enabled to support a three-way call between a first, second and third exchange, and the PPNBE internal protocol may accordingly route call content and signaling to support the three-way call. In another example, selective call rejection may be supported by the method 1000 by delivering associated selective call rejection signaling messages and routing call content packets so that a recorded "call rejected" message may be heard by a calling party. Other call feature and services may also be supported by the method 1000. Generally, any known communication feature corresponding to a call routed through the PPNBE may be supported using the logical call control entity, the logical routing database and the internal PPNBE protocol.

The method 1000 may include establishing overlapping calls of multiple types using the PPNBE. For example, the method 1000 may establish an on-net or an off-net local call, and during a lifetime of the on-net local call, the method 1000 may also establish an on-net or an off-net long distance call.

Finally, at block 1012, the method 1000 may end.

Figure 11:
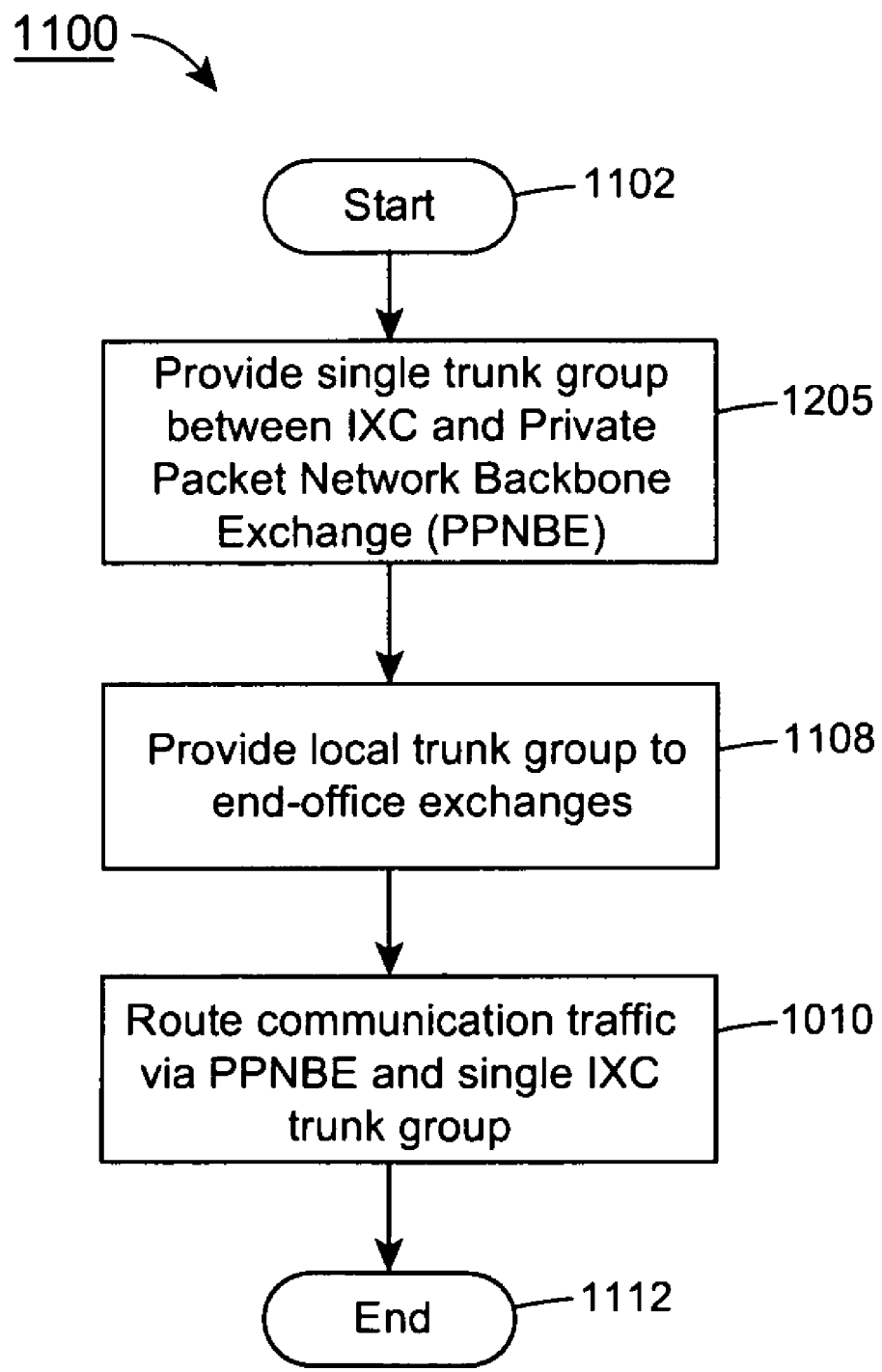
FIG. 11 illustrates an embodiment of a method for providing communication service between an IXC and a plurality of end-office exchanges using a PPNBE.

FIG. 11 depicts an embodiment of a method 1100 for providing communication service between an inter-exchange carrier (IXC) and a plurality of end-office exchanges using a private packet network backbone exchange. In some embodiments, the plurality of end-office exchanges may include an RBOC end-office exchange and/or a CLEC end-office exchange. The method 1100 may operate in conjunction with embodiments of the private packet network backbone exchange described in FIGS. 2A, 2B and/or FIG. 3, and in conjunction with embodiments of the disclosure of FIG. 9.

At the start 1102, the method 1100 may provide a single or only IXC trunk group between the IXC and a private packet network backbone exchange (block 1105). The only IXC trunk group may support a volume of traffic greater than a maximum volume of traffic serviced by a maximally-apportioned IXC trunk group between the IXC and a conventional access tandem.

At the block 1108, the method 1100 may provide a local trunk group from the PPNBE to each of the plurality of end-office exchanges. A total number of end-office exchanges and/or a total number of local trunk groups between the PPNBE and each end-office exchange may be configured so that a pre-determined population of codes may be covered for terminations from the IXC to the end-office exchanges. Alternatively or additionally, the number of end-office exchanges and/or a total number of local trunk groups between the PPNBE and each end-office exchange may be configured to support a pre-determined population of end-office exchange subscribers.

The method 1100 may include routing communication traffic between the PPNBE and the IXC via the only IXC trunk group (block 1010). The routed communication traffic may include calls terminating to any of the plurality of end-offices from the IXC and calls originating from any of the plurality of end-offices destined for the IXC. The communication traffic may include voice calls, data calls, or hybrid voice and data calls.

In effect, the method 1100 provides for substituting the PPNBE for an existing grouping of access tandems. When the PPNBE is substituted for one or more terminating access tandems, the method 1100 may include instructing IXC customers to override a single route indicated by the LERG or to use a chosen route from a plurality of routes indicated by the LERG, and thus may route calls from the IXC to a PPNBE code instead of end-office exchange codes. The PPNBE may provide each end-office exchange with a meet point billing record for each terminating call to facilitate billing of common trunk and access charges to an IXC customer of record.

When the PPNBE is substituted for one or more originating access tandems, the method 1100 may include instructing each end-office exchange to override the LERG or to use a chosen route from a plurality of routes indicated by the LERG. Accordingly, each end-office exchange may route calls to the PPNBE code instead of to a code of the IXC.

Finally, at step 1112, the method 1100 may end.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

What is claimed:

1. A private packet network backbone exchange (PPNBE) for providing communication service, comprising:
    a logical call control entity;
    a single logical routing database coupled to the logical call control entity;
    a signaling connection to a signaling network, the signaling connection coupled to the logical call control entity;
    a private packet network;
    a first connection between the private packet network and a first exchange; and
    a second connection between the private packet network and a second exchange, wherein:
        the logical call control entity is in signaling communication with the first and the second exchanges, the signaling communication enabled by the signaling connection,
        the logical call control entity is configured to establish, while operating in conjunction with the single logical routing database, a one-hop communication session between the first and the second exchanges over the private packet network without traversing any other exchanges,
        a content of the one-hop communication session includes at least one of voice or data and is delivered over the private packet network,
        the PPNBE is configured to establish separate one-hop communication sessions for:
            a local call between an originating local exchange and a first terminating local exchange,
            a long distance call between the originating local exchange and a different terminating local exchange,
            a first tandem call between the originating local exchange and a terminating tandem exchange, and
            a second tandem call between an originating tandem exchange and the first terminating local exchange.

2. The PPNBE of claim 1, wherein the PPNBE provides nationwide communication service.

3. The PPNBE of claim 1, wherein the PPNBE is further configured to establish separate one-hop communication sessions for:
    a first inter-exchange call between the originating local exchange and a terminating inter-exchange carrier (IXC), and
    a second inter-exchange call between an originating IXC and the first terminating local exchange.

4. The PPNBE of claim 1, wherein the first exchange and the second exchange are controlled by different communication carriers.

5. The PPNBE of claim 1, wherein a local access technology by which a first customer-premise equipment (CPE) accesses the originating local exchange and a local access technology by which a second CPE accesses the first or the different terminating local exchange are each from a set of local access technologies including wireless, wireline, data communication, VoIP and cable telephony.

6. The PPNBE of claim 5, wherein the local access technology corresponding to the first CPE and the local access technology corresponding to the second CPE are different.

7. The PPNBE of claim 1, wherein the signaling network is an SS7 network.

8. The PPNBE of claim 1, wherein the first exchange is one of:
    a LEC local exchange;
    a CLEC local exchange;
    an exchange or gateway corresponding to a specific local access technology, the specific local access technology being a member of a set of local access technologies including wireless, wireline, data communication, VoIP and cable telephony;
    an inter-exchange carrier (IXC);
    a tandem exchange;
    a customer-premises equipment,
    a PBX, or
    an international gateway exchange.

9. The PPNBE of claim 1, wherein the PPNBE further comprises a first PPNBE gateway coupled to the private packet network, and wherein the first connection is between the first exchange and the first PPNBE gateway and the second connection is between the second exchange and the first PPNBE gateway.

10. The PPNBE of claim 9, wherein the logical call control entity is co-located with a second PPNBE gateway coupled to the private packet network and wherein the content of the one-hop communication session is routed internal to the first PPNBE gateway and is not backhauled between the first and the second PPNBE gateways.

11. The PPNBE of claim 1, wherein the PPNBE further comprises a first and a second PPNBE gateway each coupled to the private packet network, and where the first connection is between the first exchange and the first PPNBE gateway and the second connection is between the second exchange and the second PPNBE gateway.

12. The PPNBE of claim 1, wherein the private packet network backbone exchange further includes a direct connection between the private packet network and a third customer premises equipment.

13. The PPNBE of claim 1, wherein the private packet network uses an Internet Protocol or other packet or cell switching technology.

14. The PPNBE of claim 1, wherein at least one of the logical call control entity or the single logical routing database resides on one or more physical components of the private packet network backbone exchange.

15. The PPNBE of claim 1, wherein a billing charge for the long distance call is independent of a distance of a route traversed by the long distance call.

16. A method of providing cost-efficient communication service between an inter-exchange carrier (IXC) and a plurality of end-office exchanges, comprising:
providing an IXC trunk group connection to an only IXC trunk group between the IXC and a private packet network backbone exchange (PPNBE);
providing a local trunk group connection to a local trunk group between the PPNBE and each of the plurality of end-office exchanges;
controlling traffic within the PPNBE with a logical call control entity in signaling communication with the IXC and with each of the plurality of end-office exchanges;
coupling a single logical routing database to the logical call control entity;
providing a signaling connection at the PPNBE to a signaling network, the signaling connection enabling the signaling communication to and from the logical call control entity;
coupling a private packet network to the logical call control entity, and configuring the private packet network to carry call content and optionally signaling corresponding to a call established by the logical call control entity in conjunction with the single logical routing database;
coupling the private packet network to the IXC trunk group connection;
coupling the private packet network to each of the local trunk group connections;
establishing, by the logical call control entity in conjunction with the single logical routing database, a call instance in the PPNBE corresponding to each call in a volume of communication traffic between the IXC and the plurality of end-office exchanges; and
routing the volume of communication traffic over the only IXC trunk group, wherein the volume of communication traffic:
includes a plurality of calls each of which terminates to or originates from any of the plurality of end-office exchanges over a corresponding local trunk group,
is greater than a maximum volume of communication traffic serviced by a maximally-apportioned trunk group between the IXC and a tandem exchange, and
includes at least one of voice calls, data calls or hybrid voice and data calls.

17. The method of claim 16, wherein the plurality of end-office exchanges includes at least one of a LEC end-office exchange or a CLEC end-office exchange.

18. The method of claim 16:
wherein establishing the call instance in the PPNBE corresponding to each call in the volume of communication traffic comprises establishing a call instance corresponding to at least one originating call in the volume of communication traffic, wherein the at least one originating call:
is received at a specific local trunk group connection corresponding to a specific local trunk group between the private packet network and one of the plurality of end-office exchanges,
is destined for the IXC, and
includes one of:
routing information different than an only Local Exchange Routing Guide (LERG)-supported route corresponding to the at least one originating call, or
routing information corresponding to a selected LERG-supported origination route, the selected LERG-supported origination route one of a plurality of LERG-supported origination routes corresponding to the at least one originating call; and
wherein routing the volume of communication traffic includes routing a call content of the at least one originating call over the private packet network to the IXC trunk group connection.

19. The method of claim 16:
wherein establishing the call instance in the PPNBE corresponding to each call in the volume of communication traffic comprises establishing a call instance corresponding to at least one terminating call in the volume of communication traffic, wherein the at least one terminating call:
is received at the IXC trunk group connection,
is destined for a particular end-office exchange, and
includes one of:
routing information different than an only LERG-supported route corresponding to the at least one terminating call, or
routing information corresponding to a selected LERG-supported termination route, the selected LERG-supported termination route one of a plurality of LERG-supported termination routes corresponding to the at least one terminating call; and
wherein routing the volume of communication traffic includes routing a call content of the at least one terminating call over the private packet network to a specific local trunk group connection corresponding to the particular end-office exchange.

20. The method of claim 19, further comprising providing a meet point billing record to an IXC customer-of-record indicated in an EMI record, the meet point billing record corresponding to the at least one terminating call.

21. A method for providing communication service, comprising:
receiving a call at a private packet network backbone exchange (PPNBE) via a first connection between a first exchange and a first gateway of the PPNBE, the call being one of a voice, data or hybrid voice and data call and the first exchange supporting a first local access technology from a group of local access technologies including wireless, wireline, data communication, VoIP and cable telephony;
controlling traffic within the PPNBE with a logical call control entity in signaling communication with the first and a second exchange, the second exchange supporting a second local access technology;
coupling a single logical routing database to the logical call control entity;
coupling a signaling connection to a signaling network to the logical call control entity, the signaling connection enabling the logical call control entity to be in signaling communication with the first and the second exchanges;
coupling the first gateway of the PPNBE and a second gateway of the PPNBE to a private IP packet network;

establishing, by the logical call control entity in conjunction with the single logical routing database, a call instance in the PPNBE corresponding to the call; and routing, within the PPNBE via the private IP packet network and a second connection between the second gateway of the PPNBE and the second exchange, the call to the second exchange; and enabling the PPNBE to establish:
- a local call between an originating local exchange and a terminating local exchange,
- a long distance call between the originating local exchange and a different terminating local exchange,
- a first tandem call between the originating local exchange and a terminating tandem exchange,
- a second tandem call between an originating tandem exchange and the terminating local exchange;
- an first inter-exchange call between the originating local exchange and a terminating inter-exchange carrier (IXC), and
- a second inter-exchange call between an originating IXC and the terminating local exchange.

22. The method of claim 21, wherein the first local access technology is different than the second local access technology.

23. The method of claim 21, wherein the first exchange and the second exchange are controlled by different communication carriers.

24. The method of claim 21, wherein when the first gateway and the second gateway are a same gateway and when the logical call control entity is co-located with a third gateway of the PPNBE, routing the call comprises routing the call within the same gateway without backhauling a content of the call to the third gateway.

25. The method of claim 21, further comprising establishing, by the logical call control entity, at least one of a call feature or a call service associated with the call.

26. The method of claim 21, further comprising establishing, by the logical call control entity, at least one of:
- a second call instance corresponding to a second call originating from the first or the second exchange and terminating to a customer-premises equipment (CPE) directly connected to a corresponding gateway of the PPNBE, or
- a third call instance corresponding to a third call originating from the CPE and terminating to the first or the second exchange.

27. A private packet network backbone exchange (PPNBE) for providing communication service, comprising:
- means for providing an IXC trunk group connection to an only IXC trunk group between the IXC and a private packet network backbone exchange (PPNBE);
- means for providing a local trunk group connection to a local trunk group between the PPNBE and each of a plurality of end-office exchanges;
- means for controlling traffic within the PPNBE with a logical call control entity in signaling communication with the IXC and with each of the plurality of end-office exchanges;
- means for providing a signaling connection at the PPNBE to a signaling network, the signaling connection enabling the signaling communication to and from the logical call control entity;
- means for coupling a private packet network to the logical call control entity, and configuring the private packet network to carry call content and optionally signaling corresponding to a call established by the logical call control entity by using a packet or cell switching technology;
- means for coupling the private packet network to the IXC trunk group connection;
- means for coupling the private packet network to each of the local trunk group connections;
- means for establishing, by the logical call control entity, a call instance in the PPNBE corresponding to each call in a volume of communication traffic between the IXC and the plurality of end-office exchanges; and
- means for routing the volume of communication traffic over the only IXC trunk group, wherein the volume of communication traffic:
  - includes a plurality of calls each of which terminates to or originates from any of the plurality of end-office exchanges over a corresponding local trunk group,
  - is greater than a maximum volume of communication traffic serviced by a maximally-apportioned trunk group between the IXC and a tandem exchange, and
  - includes at least one of voice calls, data calls or hybrid voice and data calls.

\* \* \* \* \*